(12) United States Patent
Ko et al.

(10) Patent No.: US 9,277,576 B2
(45) Date of Patent: Mar. 1, 2016

(54) METHOD AND DEVICE FOR EXECUTING APPLICATION

(71) Applicant: SAMSUNG ELECTRONICS CO., LTD., Suwon-si (KR)

(72) Inventors: Jae-woo Ko, Uiwang-si (KR); Hang-sik Shin, Yongin-si (KR); Se-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 14/022,903

(22) Filed: Sep. 10, 2013

(65) Prior Publication Data
US 2014/0073244 A1 Mar. 13, 2014

(30) Foreign Application Priority Data
Sep. 10, 2012 (KR) ........................ 10-2012-0099791

(51) Int. Cl.
*H04W 4/00* (2009.01)
*H04W 76/02* (2009.01)
*H04L 29/06* (2006.01)
(Continued)

(52) U.S. Cl.
CPC ............ *H04W 76/023* (2013.01); *H04L 69/14* (2013.01); *H04W 4/008* (2013.01); *H04L 67/125* (2013.01); *H04L 67/34* (2013.01); *H04W 88/06* (2013.01)

(58) Field of Classification Search
USPC ................. 455/552.1, 41.1, 41.2, 434, 452.2, 455/456.1, 566, 73, 466, 422.1, 414.1, 517, 455/515, 67.13
See application file for complete search history.

(56) References Cited

U.S. PATENT DOCUMENTS

| 2008/0057868 A1 | 3/2008 | Chang |
| 2009/0111378 A1 | 4/2009 | Sheynman et al. |
| 2009/0201850 A1* | 8/2009 | Davis ................ G01S 5/0009 370/328 |

(Continued)

FOREIGN PATENT DOCUMENTS

| EP | 1 517 489 A2 | 3/2005 |
| EP | 2 302 883 A1 | 3/2011 |
| EP | 2 302 884 A1 | 3/2011 |

OTHER PUBLICATIONS

Communication dated Jun. 3, 2014 issued by the European Patent Office in counterpart European Patent Application No. 13183817.9.

(Continued)

*Primary Examiner* — Ganiyu A Hanidu
(74) *Attorney, Agent, or Firm* — Sughrue Mion, PLLC

(57) ABSTRACT

A method for executing an application based on a connection between devices by automatically connecting devices, and a device, are disclosed. The method includes: detecting an occurrence of first short distance communication between at least one external device and the device; receiving connection information which relates to a second short distance communication mode and application information which relates to the at least one external device from the at least one external device via the first short distance communication; establishing a connection based on the second short distance communication mode between the at least one external device and the device based on the received connection information which relates to the second short distance communication mode; and controlling the at least one external device via the second short distance communication mode by using an application which is executable based on the received application information.

30 Claims, 9 Drawing Sheets

(51) Int. Cl.
*H04L 29/08* (2006.01)
*H04W 88/06* (2009.01)

(56) References Cited

U.S. PATENT DOCUMENTS

| | | | |
|---|---|---|---|
| 2009/0227282 A1* | 9/2009 | Miyabayashi | H04L 63/0492 455/552.1 |
| 2010/0317289 A1 | 12/2010 | Desai et al. | |
| 2011/0039494 A1 | 2/2011 | Shon et al. | |
| 2011/0172741 A1 | 7/2011 | Roberts et al. | |
| 2012/0110568 A1* | 5/2012 | Abel | G06F 8/61 717/178 |
| 2012/0139449 A1* | 6/2012 | Zilber | H05B 37/0227 315/307 |
| 2012/0179754 A1* | 7/2012 | Nilsson | G06F 8/65 709/204 |
| 2012/0196534 A1 | 8/2012 | Kasslin et al. | |
| 2012/0307658 A1* | 12/2012 | Xia | H04L 47/122 370/252 |
| 2012/0309309 A1* | 12/2012 | Cho | H04W 76/023 455/41.1 |
| 2013/0065584 A1* | 3/2013 | Lyon | H04W 28/06 455/434 |

OTHER PUBLICATIONS

Joe Decuir et al; "Bluetooth 4.0: Low Energy", Nov. 22, 2010; "http://chapters.comsoc.org/vancouver/BTLER3.pdf"; XP055119095; 62 pgs.
International Search Report dated Jan. 13, 2014 issued in International Application No. PCT/KR2013/008115 (PCT/ISA/210/220).
Written Opinion dated Jan. 13, 2014 issued in International Application No. PCT/KR2013/008115 (PCT/ISA/237).

\* cited by examiner

METHOD AND DEVICE FOR EXECUTING APPLICATION

CROSS-REFERENCE TO RELATED PATENT APPLICATION

This application claims priority from Korean Patent Application No. 10-2012-0099791, filed on Sep. 10, 2012 in the Korean Intellectual Property Office, the disclosure of which is incorporated herein by reference in its entirety.

BACKGROUND

1. Field

Exemplary embodiments relate to application execution, and more particularly, to a method and device for executing an application based on connections between devices.

2. Description of the Related Art

Types of applications that may be used in devices such as smart phones, hand-held personal computers (PCs), tablet PCs, and smart televisions (TVs), have become diverse. Accordingly, applications which are executable based on connections between devices have been developed. For example, applications which are executable based on a connection between a portable terminal and an accessory device have been developed.

However, with developments in communication technology, connection methods between devices have become more diverse. Accordingly, when devices are connected to each other in order to execute an application, a user experiences inconvenience due to the necessity of identifying and setting connection methods between devices for each device. For example, the user needs to inconveniently identify and set a connection method between the portable terminal and the accessory device in each of the portable terminal and the accessory device.

SUMMARY

Exemplary embodiments provide a method for executing an application based on a connection between devices by automatically connecting devices, and a device.

Exemplary embodiments also provide a method for executing an application based on a connection between devices by automatically connecting devices via wireless communication, and a device.

Exemplary embodiments also provide a method for executing an application based on a connection between a portable terminal and an accessory device by automatically connecting the portable terminal and the accessory device, the portable terminal, and the accessory device.

According to an aspect of one or more exemplary embodiments, there is provided an application execution method which is performable by using a first device, the method including: detecting an occurrence of a first short distance communication between at least one external device and the first device; receiving connection information which relates to a second short distance communication mode and application information which relates to the at least one external device from the at least one external device via the first short distance communication; establishing a connection based on the second short distance communication mode between the at least one external device and the first device by using the received connection information; and controlling the at least one external device via the second short distance communication mode by using an application which is executable based on the received application information.

The detecting the occurrence of the first short distance communication may be performed by using one of near field communication (NFC) and Bluetooth low energy (BLE) communication.

The detecting the occurrence of the first short distance communication may be performed based on whether a distance between the at least one external device and the first device is within a first short distance communication radius.

The detecting the occurrence of the first short distance communication may be performed based on whether a broadcast signal based on BLE communication is received from the at least one external device.

The method may further include: displaying information which relates to the at least one external device; and establishing the connection based on the second short distance communication mode when a connection between the first device and an external device from among the at least one external device is selected based on the displayed information which relates to the at least one external device.

The connection information which relates to the second short distance communication mode may include information which relates to the second short distance communication mode which is performed by the at least one external device and additional information to be used when establishing the connection between the first device and the at least one external device based on the second short distance communication mode.

The additional information may include address information which relates to the at least one external device when the second short distance communication mode is based on a direct communication mode between devices.

The establishing the connection based on the second short distance communication mode may include: determining the second short distance communication mode between the at least one external device and the first device by using the received connection information which relates to the second short distance communication mode; transmitting, from the first device to the at least one external device, connection information which relates to a relay to the at least one external device via first short distance communication when the second short distance communication mode is based on a communication mode which uses the relay; and receiving, from the at least one external device, a signal which indicates that a connection between the relay and the at least one external device is established.

The establishing the connection based on the second short distance communication mode may include: determining the second short distance communication mode between the at least one external device and the first device by using the received connection information which relates to the second short distance communication; transmitting, from the first device to the at least one external device, a connection request signal by using the received connection information which relates to the second short distance communication when the second short distance communication mode is based on a direct communication between devices; and receiving a connection acceptance signal from the at least one external device.

The second short distance communication mode may include at least one from among a wireless local area network (LAN) communication mode, a wireless fidelity (WiFi) direct communication mode, a Bluetooth communication mode, an ultra wideband (UWB) communication mode, and a Zigbee communication mode.

The establishing the connection based on the second short distance communication mode may include: registering the at least one external device in the first device when a registration request is received from the at least one external device.

The application information which relates to the at least one external device may include at least one of identification information which relates to the application and an execution command.

The controlling the at least one external device may include: searching for the application from the first device by using the received application information; if the application is determined not to be installed in the first device as a result of the searching, downloading and executing the application from an outside; and if the application is determined to be installed in the first device as a result of the searching, executing the application by the first device.

The connection information which relates to the second short distance communication mode may further include authentication information which relates to the at least one external device, wherein the establishing the connection based on the second short distance communication is performed after performing authentication processing by using the received authentication information.

According to another aspect of one or more exemplary embodiments, there is provided a first device including: a first short distance communication unit which is configured to communicate between at least one external device and the first device by using a first short distance communication mode; a second short distance communication unit which is configured to communicate between the at least one external device and the first device by using a second short distance communication mode, when the first device is connected to the at least one external device based on a connection information which relates to the second short distance communication mode which is received from the at least one external device via the first short distance communication unit; and a processor which is configured to receive the connection information which relates to the second short distance communication mode and application information which relates to the at least one external device via the first short distance communication unit, in order to establish a connection between the at least one external device and the first device based on the connection information which relates to the second short distance communication mode, and to control the at least one external device via the second short distance communication unit by executing an application based on the received application information.

According to another aspect of one or more exemplary embodiments, there is provided an application execution method which is performable by using an external device, the method including: detecting an occurrence of first short distance communication between at least one device and the external device; transmitting connection information which relates to a second short distance communication mode to be performed by the external device and application information which relates to the external device to the at least one device via first short distance communication; establishing a connection based on a second short distance communication mode between the external device and the at least one device based on the information which is received from the at least one device; receiving a control signal based on an application which is executed by the at least one device via the second short distance communication mode; and operating the external device based on the received control signal.

The information which is received from the at least one device may include a connection request signal when the second short distance communication mode is based on a direct communication mode between devices and connection information which relates to a relay when the second short distance communication mode is based on a communication mode which uses the relay.

According to another aspect of one or more exemplary embodiments, there is provided an application execution method which is performable by using an external device, the method including: broadcasting connection information which relates to a second short distance communication mode and application information which relates to the external device via first short distance communication; establishing a connection which is based on the second short distance communication mode between at least one device and the external device based on information which is received from the at least one device; receiving a control signal via an application which is executed by the at least one device via the second short distance communication mode; and operating hardware of the external device based on the received control signal.

According to another aspect of one or more embodiments, there is provided a non-transitory computer readable recording medium storing at least one program which includes commands for executing an application execution method which is performable by using a first device, wherein the application execution method is performable by using the first device in the same manner as the above-described application execution method which is performable by using the first device.

According to another aspect of one or more exemplary embodiments, there is provided a non-transitory computer readable recording medium storing at least one program which includes commands for executing an application execution method which is performable by using an external device, wherein the application execution is performable by using the external device in the same manner as the above-described application execution method which is performable by using the external device.

BRIEF DESCRIPTION OF THE DRAWINGS

The above and other features and advantages of the present inventive concept will become more apparent by describing in detail exemplary embodiments thereof with reference to the attached drawings in which.

DETAILED DESCRIPTION

Figure 1:
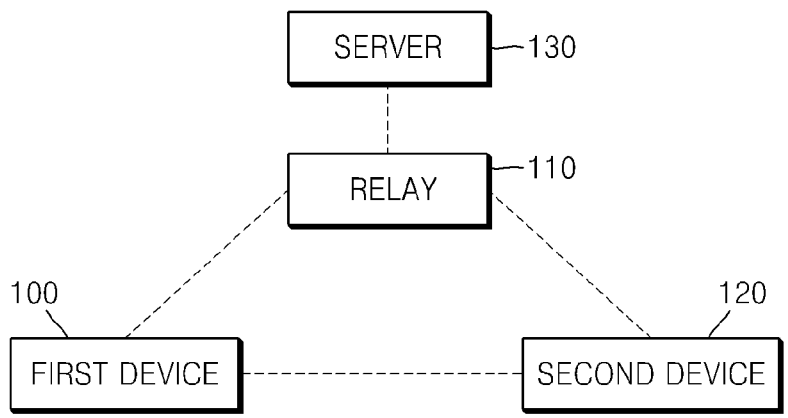
FIG. 1 illustrates a configuration of an application execution system, according to an exemplary embodiment.

As the present inventive concept allows for various changes and numerous embodiments, particular exemplary embodiments will be illustrated in the drawings and described in detail in the written description. However, this is not intended to limit the present inventive concept to particular modes of practice, and it will be appreciated that all changes, equivalents, and substitutes that do not depart from the spirit and technical scope of the present inventive concept are encompassed in the present inventive concept. In the detailed description, certain detailed explanations of the related art are omitted when it is deemed that they may unnecessarily obscure the essence of the exemplary embodiments.

Terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that are widely used in the technical art to which the exemplary embodiments pertain. However, some of the terms used herein may be created to reflect intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the exemplary embodiments.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Throughout the specification, an 'application' refers to a computer program which is devised to perform specific operations based on a connection between devices that will be described later. For example, the application may include any one or more of a game application, an instrument playing application, a moving image reproduction application, a music reproduction application, a map application, a broadcasting application, an exercise support application, a medical application, a payment application, a transportation mode (for example, a car, a bus, an airplane, or a ship) automatic navigation application, a peripheral device control application, and the like.

Throughout the specification, a first device is a device which independently executes an application. A second device is a device which is connected to the first device in order to execute the application. According to roles of the first device and the second device with respect to the execution of the application, the first device may be referred to as a host device or a portable terminal, and the second device may be referred to as an accessory device or an external device. The second device may be referred to as hardware which operates in conjunction with the application.

For example, when the application is a transportation mode automatic navigation application, the second device may be a car which communicates with the first device, and the first device may be a device which controls the second device by installing an automatic navigation application for the car. When the application is an insulin monitoring application, the second device may be a device which communicates with the first device and which measures insulin resistance and sensitivity, and the first device may be a device which controls the second device by installing the insulin monitoring application.

Throughout the specification, an ad-hoc mode wireless local area network (LAN) and an infrastructure mode wireless LAN are examples of communication mode which is identifiable based on whether a relay is used during short distance communication between devices. In particular, the ad-hoc mode wireless LAN is an example of a direct communication mode between devices without a relay, and may include, for example, a WiFi direct (WFD) communication network. The infrastructure mode wireless LAN is an example of a communication mode between devices via a relay, and may be a WiFi communication network. Thus, the ad-hoc mode wireless LAN throughout the specification is to be understood as being the direct communication mode between devices without any relay, and the infrastructure mode wireless LAN throughout the specification is to be understood as being the communication mode between devices via a relay.

The present inventive concept will now be described more fully with reference to the accompanying drawings, in which exemplary embodiments are shown. Like reference numerals in the drawings denote like elements and thus their descriptions will not be repeated herein.

FIG. 1 illustrates a configuration of an application execution system, according to an exemplary embodiment.

Referring to FIG. 1, the application execution system includes a first device 100, a relay 110, a second device 120, and a server 130, but is not limited thereto. In particular, the application execution system may include more or less elements than those shown in FIG. 1.

For example, the application execution system may not include the relay 110 and the server 130. In this case, the first device 100 and the second device 120 may be connected to each other via a direct communication mode between devices. The direct communication mode between devices provides for direct transmission and reception of data between devices without the relay 110. Examples of the direct communication mode between devices may include any one or more of a Bluetooth communication mode, an ultra wideband (UWB) communication mode, a Zigbee communication mode, and a WiFi direct communication mode, but is not limited thereto. The direct communication mode between devices may be referred to as a machine-to-machine (M2M) communication mode, a device-to-device (D2D) communication mode, or a peer to peer (P2P) communication mode.

The application execution system may not include the relay 110 and the server 130 but may include a plurality of first devices 100. In this case, the plurality of first devices 100 and the second device 120 may be connected to each other via the direct communication mode between devices. For example, when the plurality of first devices 100 are portable terminals, and the second device 120 is a printer, the plurality of portable terminals may be connected to the printer via a direct communication mode between devices.

The application execution system may not include the relay 110 and the server 130 but may include a plurality of second devices 120. In this case, the first device 100 and the plurality of second devices 120 may be connected to each other via the direct communication mode between devices. For example, when the first device 100 is a portable terminal, and the plurality of second devices 120 are a speaker and a microphone, the portable terminal may be connected to the speaker and the microphone via a direct communication mode between devices.

The application execution system may not include the relay 110 and the server 130 and may include a plurality of first devices 100 and a plurality of second devices 120. In this case, the plurality of first devices 100 and the plurality of second devices 120 may be connected to each other via the direct communication mode between devices. For example, when the plurality of first devices 100 are portable terminals, and the plurality of second devices 120 are scanners, each of the portable terminals may be connected to each of the scanners via the direct communication mode between devices.

The application execution system may not include the server 130 and may include the first device 100, the relay 110, and the second device 120. When the application execution system of FIG. 1 includes the relay 110, the first device 100 and the second device 120 may selectively use each of a communication mode for transmitting data via the relay 110 and the direct communication mode between devices without the relay 110.

The first device 100 and the second device 120 may be connected to each other by wire and/or wirelessly. In particular, according to exemplary embodiments, the first device 100 may be connected to the second device 120 via short distance communication. According to exemplary embodiments, short distance communication between the first device 100 and the second device 120 may be defined as including first short distance communication and second short distance communication.

According to exemplary embodiments, the first short distance communication is communication in which the first device 100 recognizes the second device 120 and performs communication with the second device 120 before connecting the second short distance communication between the first device 100 and the second device 120. The recognizing the second device 120 by the first device 100 may include, for example, recognizing a communication mode which is performed by the second device 120 and an application which relates to the second device 120 during the second short distance communication. Recognizing the second device 120 by the first device 100 may include in a communication process which is performed between the first device 100 and the second device 120 before connecting the second short distance communication between the first device 100 and the second device 120.

The first short distance communication may be referred to as communication which is performed between the first device 100 and the second device 120 before the first device 100 executes an application. The first short distance communication may be performed based on one of a near field communication (NFC) mode and a Bluetooth low energy (BLE) communication mode, but is not limited thereto.

The NFC mode may bi-directionally transmit data between the first device 100 and the second device 120 if a distance between the first device 100 and the second device 120 is within a first short distance communication radius. The first device 100 may read data which is stored in the second device 120 while operating in the NFC mode. In this case, the second device 120 may perform the NFC mode based on an NFC tag. The first short distance communication radius is currently known to be about 10 cm, but is not limited thereto. The distance between the first device 100 and the second device 120 is based on a current location of the first device 100 and a current location of the second device 120.

The second device 120 may provide or transmit connection information which relates to a second short distance communication mode to be performed by the second device 120, application information which relates to the second device 120, a connection request signal, a connection acceptance signal, and a connection notification signal, which will be described below, to the first device 100 while operating in the NFC mode, but is not limited thereto.

The second short distance communication is communication performed between the first device 100 and the second device 120 in order for the first device 100 to control the second device 120 after the first device 100 executes an application. Examples of the second short distance communication may include any one or more of Bluetooth communication, UWB communication, Zigbee communication, WiFi direct communication, and infrastructure mode wireless LAN (e.g., WiFi) communication, but is not limited thereto.

Information which relates to the second short distance communication mode may include information which indicates whether the second short distance communication mode is a communication mode via the relay 110 or a direct communication mode between devices. For example, the information which relates to the second short distance communication mode may include information which indicates the infrastructure mode wireless LAN (e.g., WiFi) communication mode or Bluetooth communication mode, but is not limited thereto.

When the information which relates to the second short distance communication mode includes the information which indicates the infrastructure mode wireless LAN communication mode, the connection information which relates to the second short distance communication mode may include information which relates to the second short distance communication mode, and may not include the above-described additional information.

When the information which relates to the second short distance communication mode includes the information which indicates the Bluetooth communication mode, the connection information which relates to the second short distance communication mode may include an address of the second device 120, such as a media access control (MAC) address of the second device 120, or an Internet protocol (IP) address of the second device 120, as additional information.

The connection information which relates to the second short distance communication mode is not limited thereto. In particular, the connection information which relates to the second short distance communication may include authentication information, irrespective of whether the second short distance communication uses the relay 110. The authentication information is used to authenticate the second device 120 if the second device 120 is a device which is controllable via an application which is executed by the first device 100 or a device which is allowed to connect the first device 100. When an N number of second devices 120 are connected to the first device 100, the N number of second devices 120 may have the same authentication information.

The application information which relates to the second device 120 may include at least one of application identification information and an application execution command, but is not limited thereto. The application identification information may include information which is usable to search for an application in the first device 100 or the server 130.

The first device 100 may transmit connection information which relates to the relay 110, connection information which relates to the second short distance communication mode to be performed by the first device 100, and a connection request signal to the second device 120 by using the NFC mode, but is not limited thereto. In this regard, the first device 100 may write the above-described information to the NFC tag of the second device 120, but is not limited thereto.

The BLE communication mode has a characteristic of seamlessly broadcasting information. Thus, when the first short distance communication is based on the BLE communication mode, the second device 120 seamlessly broadcasts information which includes the above-described connection information which relates to the second short distance communication mode and the application information which relates to the second device 120. The BLE communication mode has a maximum transmission distance which is equal to or greater than 100 m. Thus, if the distance between the second device 120 and the first device 100 is within 100 m, the first device 100 includes a Bluetooth function of receiving the above-described information broadcast by the second device 120.

When the second device 120 transmits the connection information which relates to the second short distance communication mode and the application information which relates to the second device 120 to the first device 100, the second device 120 may transmit identification information and service information which relates the second device 120 that the first device 100 requires, such as a manufacturer name of the second device 120, a serial number thereof, a software version thereof, and/or any other suitable type of information.

The first device 100 may perform a connection which is based on the second short distance communication mode to the second device 120 by using the connection information which relates to the second short distance communication mode which is received from the second device 120. For example, if the connection information which relates to the second short distance communication mode includes information which indicates the infrastructure mode wireless LAN communication, the first device 100 transmits the connection information which relates to the relay 110 that has been connected or is to be connected to the first device 100 to the second device 120 via the first short distance communication. When the first device 100 is not connected to the relay 110, the first device 100 transmits connection information which relates to the relay 110 which is stored in the first device 100 to the second device 120.

The connection information which relates to the relay 110 is information which may be necessary for implementing a connection to the relay 110. For example, the connection information which relates to the relay 110 may include a service set identifier (SSID), channel information, security and authentication key information, encryption key information, an IP address, a MAC address, and/or any other suitable type of information, but is not limited thereto.

The second device 120 transmits the connection request signal to the relay 110 by using the connection information which relates to the relay 110. If the second device 120 receives the connection acceptance signal from the relay 110, the second device 120 transmits the connection notification signal which indicates that the second device 120 is connected to the relay 110 via the first short distance communication to the first device 100.

The first device 100 recognizes that the second device 120 has been connected to the relay 110, and, if the first device 100 is connected to the relay 110, may recognize that a connection for the second short distance communication between the first device 100 and the second device 120 is established.

If the connection information which relates to the second short distance communication mode includes the information which indicates the Bluetooth communication mode, the first device 100 requests the second device 120 to connect thereto by using the received additional information. In this regard, the communication with the second device 120, which is performed by the first device 100, is the first short distance communication. If the first device 100 receives the connection acceptance signal from the second device 120 based on the first short distance communication, the connection between the first device 100 and the second device 120 for the second short distance communication is established.

If the connection for the second short distance communication is established between the first device 100 and the second device 120, the first device 100 controls the second device 120 or communicates data with the second device 120 via the second short distance communication while executing the application which relates to the second device 120. The above operation may be referred to as that the first device 100 controls the second device 120 while the first device 100 and the second device 120 execute the application.

The first device 100 may be implemented in various forms. For example, the first device 100 may include any one or more of a portable terminal, a smart phone, a notebook personal computer (PC), a tablet PC, a handheld PC, an e-book terminal, a digital broadcasting terminal, a personal digital assistant (PDA), a portable multimedia player (PMP), a navigation system, a smart television (TV), a digital consumer electronics (CE) device (for example, a refrigerator with a display panel, an air conditioner, a dish washer, etc.), an iPhone operating system (iOS)-compatible device, and/or any other suitable device, but is not limited thereto.

The first device 100 may provide at least one of an application execution function, a communication function, a media player function, a web browsing function, a word processing function, an e-mailing function, a messenger function, and/or a data storage function, and/or any other suitable function, but is not limited thereto.

The second device 120 is a device which relates to the application which is executed by the first device 100. In particular, the second device 120 is a device which operates by being combined with the application which is executed by the first device 100. The second device 120 may communicate with the first device 100 by using the first short distance communication mode and the second short distance communication mode.

The second device 120 may include any one or more of an input apparatus, an output apparatus, and a control apparatus, etc. For example, the second device 120 may include a device having a function of communicating with the first device 100, such as any one or more of a microphone, a speaker, a pedal, a joystick, a musical instrument (e.g., a piano, an organ, an electronic keyboard, a guitar, a violin, a cello, etc.), a game manipulation apparatus, a doll, a medical tool, an exercise tool, the CE device (e.g., a refrigerator with a display panel, an air conditioner, a dish washer, etc.), a security system, a camera, a measuring device, automotive accessory device (a head unit, a car stereo unit, a car navigation system, etc.), a transportation mode (a car, a bus, an airplane, a ship, etc.), etc., but is not limited thereto.

The relay 110 may include a wireless relay base station. The relay 110 may be configured to link with a wired LAN. In this case, the relay 110 may include a wired/wireless Internet sharer which has an Internet sharing function. The relay 110 may be configured to include an access point (AP) having a wired and/or wireless linking function and/or a wireless sharer which has a function of sharing Internet with the AP.

The server 130 may provide an application to the first device 100 or download the application in response to a request of the first device 100. Thus, the server 130 may be referred to as an application providing server or an external server of the first device 100 or a cloud server of the first device 100.

The server 130 may execute the application while communicating with the first device via the relay 110 and communicate with the second device 120 in response to a request of the first device 100.

Meanwhile, the application execution system of FIG. 1 may be modified in such a way that the server 130 may directly communicate with the first device 100 without the relay 110. In particular, the application execution system may be configured to include the first device 100, the second device 120, and the server 130. In this regard, the server 130 is a device which is capable of the above-described direct communication between devices, and may be referred to as a peripheral device which transmits the application to the first device 100 in response to the request of the first device 100.

Figure 2:
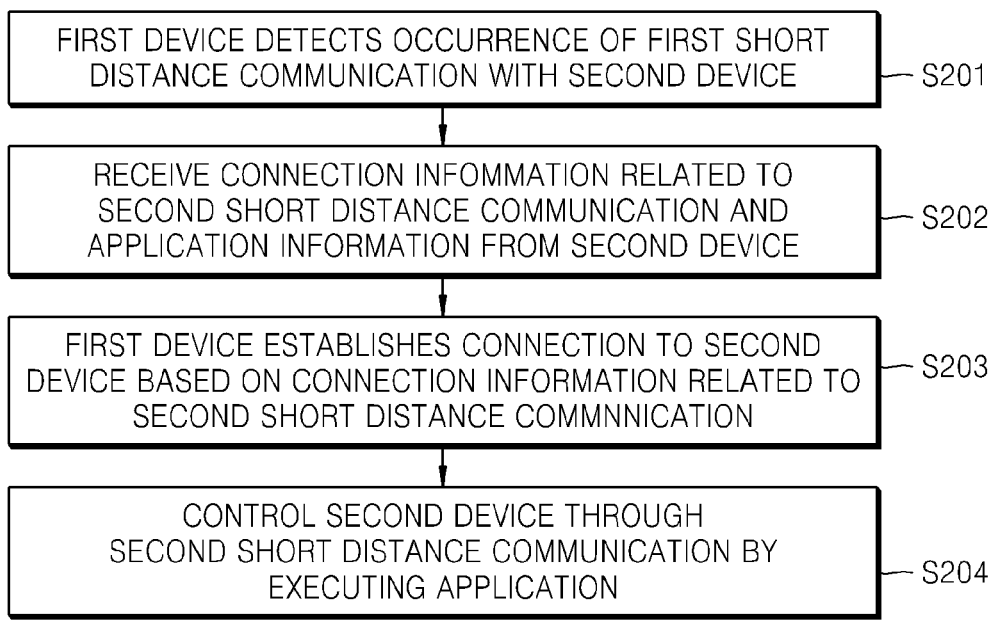
FIG. 2 is a flowchart which illustrates an application execution method which is performable by using a first device, according to an exemplary embodiment.

FIG. 2 is a flowchart which illustrates an application execution method which is performable by using the first device 100, according to an exemplary embodiment.

In operation S201, the first device 100 detects an occurrence of the first short distance communication with the second device 120.

For example, when the first short distance communication between the first device 100 and the second device 120 is based on an NFC mode, if a distance between the first device 100 and the second device 120 is within a first short distance communication radius, the first device 100 may detect the occurrence of the first short distance communication with the second device 120. When the distance between the first device 100 and the second device 120 is within the first short distance communication radius, NFC tagging may occur between the first device 100 and the second device 120. When the first short distance communication between the first device 100 and the second device 120 is based on a BLE communication mode, if the distance between the first device 100 and the second device 120 is within the first short distance communication radius, and if the first device 100 detects a reception of a signal that is broadcast based on the Bluetooth communication mode from the second device 120, the first device 100 may detect the occurrence of the first short distance communication with the second device 120.

The first short distance communication radius when the first short distance communication is based on the NFC mode is different from the first short distance communication radius when the first short distance communication is based on the BLE communication mode, as described above with reference to FIG. 1.

Figure 11:
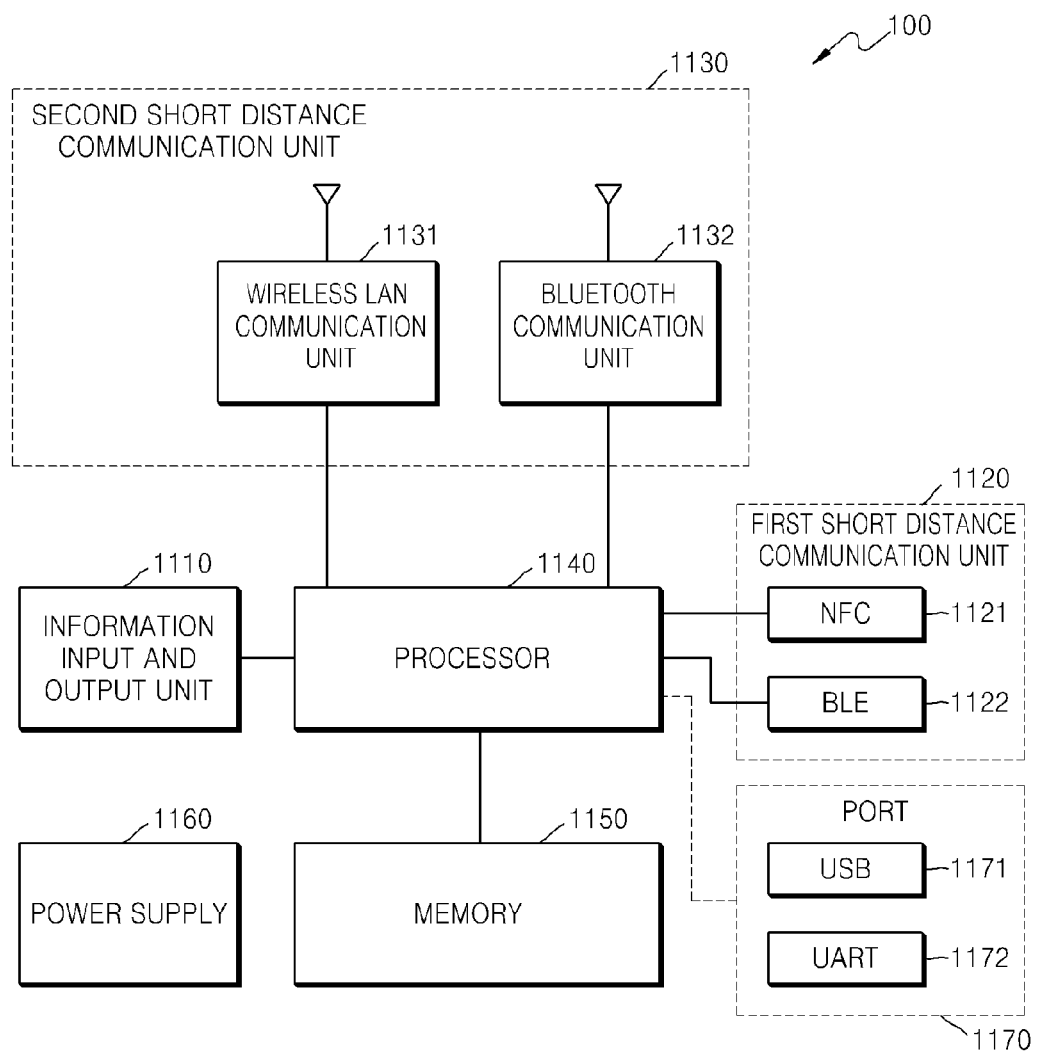
FIG. 11 is a block diagram of a first device, according to an exemplary embodiment.

To respectively detect the occurrence of the first short distance communication based on the NFC mode and the first short distance communication based on the BLE communication mode, the first device 100 may include a first short distance communication unit 1120 as illustrated in FIG. 11, which will be described below.

In operation S202, the first device 100 receives connection information which relates to the second short distance communication mode and application information which relates to the second device 120 from the second device 120. For example, when the first short distance communication is based on the NFC mode, the first device 100 may receive the above-described information which is stored in the second device 120 by reading the above-described information or by allowing the second device 120 to write the above-described information in the first device 100. When the first short distance communication is based on the BLE communication mode, the first device 100 receives the above-described information that is broadcast based on the Bluetooth communication mode from the second device 120. However, the application information may further include progress status information which relates to an application.

Figure 3:
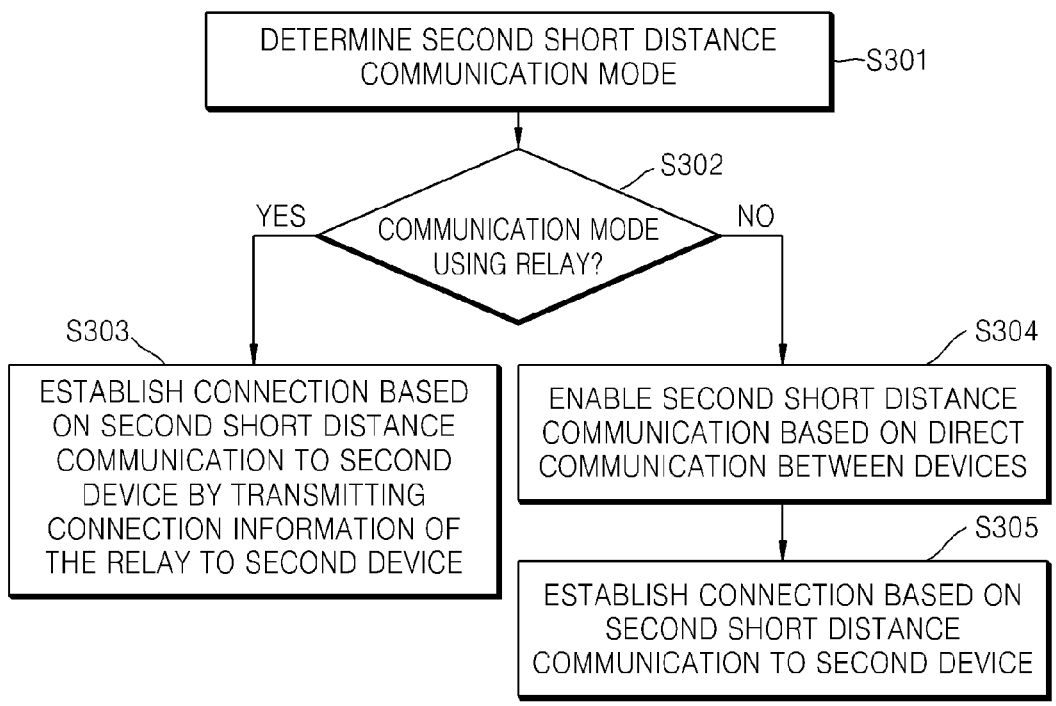
FIG. 3 is a detailed flowchart which illustrates an operation of establishing a connection based on a second short distance communication mode to a second device of FIG. 2.

In operation S203, the first device 100 establishes a connection to the second device 120 based on the connection information which relates to the second short distance communication. FIG. 3 is a flowchart which illustrates operation S203. In particular, FIG. 3 is a flowchart which illustrates the connection based on the second short distance communication mode to the second device 120, which is performed by the first device 100.

In operation S301, the first device 100 determines the second short distance communication mode which is available with respect to the second device 120. In particular, the first device 100 determines the second short distance communication mode which is available with respect to the second device 120 by using communication mode information which is included in the connection information which relates to the second short distance communication received in operation S202. The communication mode information may include information which indicates the second short distance communication mode which is available with respect to the second device 120 as described with reference to FIG. 1.

For example, when information which indicates a Bluetooth communication mode is defined as 01, and information which indicates an infrastructure wireless LAN communication mode is defined as 10, the first device 100 may detect the communication mode information from the connection information which relates to the second short distance communication. If the detected communication mode information is 01, the first device 100 may determine the second short distance communication mode used by the second device 120 as the Bluetooth communication mode. If the detected communication mode information is 10, the first device may determine the second short distance communication mode used by the second device 120 as the infrastructure wireless LAN communication mode. However, the method of determining the second short distance communication mode is not limited thereto.

When the first device 100 communicates with the server 130 via the relay 110 by using the infrastructure wireless LAN communication mode, the first device 100 may sense an occurrence of the first short distance communication with the second device 120. In this regard, if the connection information which relates to the second short distance communication which is received from the second device 120 indicates the infrastructure wireless LAN communication mode, the first device 100 may operate a WiFi mode which operates via the relay 100 as a WiFi dual mode.

In this case, the first device 100 may use the same IP address or different IP addresses in order to communicate with the server 130 and the second device 120 via the relay 110. Whether to use the same IP address or different IP addresses is determined based on the number of IP addresses set in the first device 100. In particular, when one IP address is allocated to the first device 100, the first device 100 uses the same IP address, and, if a plurality of IP addresses are allocated to the first device 100, the first device 100 may use different IP addresses or the same IP address.

The WiFi dual mode may include concurrently operating a communication mode via the relay 100 and a WiFi direct mode without the relay 100. In particular, when the first device 100 communicates with the server 130 via the relay 110 by using the infrastructure wireless LAN communication mode, the first device 100 may sense the occurrence of the first short distance communication with the second device 120. In this regard, if the connection information which relates to the second short distance communication mode which is received from the second device 120 indicates a WiFi direct communication mode, the first device 100 may perform a direct communication between devices with the second device 120 by using the WiFi direct communication mode while communicating with the server 130 via the relay 110. For example, when the first device 100 is a mobile terminal, the second device 120 is a smart TV, and the first device 100 downloads a moving image from the server 130, the first device 100 may control the second device 120 to reproduce the downloading moving image by the second device 120.

When the second device 120 performs the first short distance communication by using the BLE communication mode and the second short distance communication by using the Bluetooth communication mode, the second device 120 may be embedded with a dual mode solution, but is not limited thereto. The dual mode solution may indicate facilitating a classic Bluetooth communication mode and BLE communication mode functionality on a single chip. When the first device 100 is also configured to perform the first short distance communication and the second short distance communication by using the Bluetooth communication mode similarly as the second device 120, it may be understood that the dual mode solution is embedded in first device 100. The Bluetooth communication mode which is used for the second short distance communication may be referred to as classic Bluetooth so as to be distinguished from the BLE communication mode which is used for the first short distance communication.

When the second device 120 performs the first short distance communication by using the NFC mode and the second short distance communication by using the Bluetooth communication mode, It may be understood that the second device 120 may be embedded with a single mode solution with respect to Bluetooth communication, but is not limited thereto. When the second device 120 performs the first short distance communication by using the BLE communication mode and the second short distance communication by using a communication mode other than the Bluetooth communication mode, it may be understood that the second device 120 may be embedded with the single mode solution with respect to Bluetooth communication, but is not limited thereto.

Meanwhile, in operation S302, the first device 100 determines whether the second short distance communication mode which is available with respect to the second device 120 is a communication mode which uses the relay 110.

In particular, when the second short distance communication mode which is available with respect to the second device 120 is determined as the infrastructure mode wireless LAN communication mode in operation S301, the first device 100 recognizes that the second short distance communication mode which is available with respect to the second device 120 is the communication mode which uses the relay 110.

When the second short distance communication mode which is available with respect to the second device 120 is determined as the Bluetooth communication mode in operation S301, the first device 100 recognizes that the second short distance communication mode which is available with respect to the second device 120 is a communication mode which does not use the relay 110.

When the first short distance communication is based on the BLE communication mode, the first device 100 displays information which relates to the second device 120 before establishing the connection based on the second short distance communication mode to the second device 120 according to the above-described flowchart of FIG. 3. The information which relates to the second device 120 includes information which informs a user about the second device 120. For example, the information which relates to the second device 120 may include application information which relates to the second device 120 and manufacturer information thereof, but is not limited thereto. The information which relates to the second device 120 may be displayed on the first device 100 in an In_App advertisement form.

If a signal for a user's selection of a connection to the second device 120 based on the displayed information which relates to the second device 120 is received, the first device 100 may perform the above-described operation to establish the connection based on the second short distance communication mode to the second device 120.

In operation S303, the first device 100 transmits connection information which relates to the relay 110 to the second device 120 via the first short distance communication. Accordingly, if a connection notification which indicates that the second device 120 is connected to the relay 110 is received from the second device 120, the first device 100 performs the establishing the connection based on the second short distance communication to the second device 120 via the relay 110.

In operation S304, the first device 100 enables the second short distance communication based on a direct communication between devices. For example, when the second short distance communication mode which is performed by the second device 120 is the Bluetooth communication mode, the first device 100 enables the Bluetooth communication.

In operation S305, the first device 100 establishes the connection based on the second short distance communication to the second device 120 by using the enabled Bluetooth communication. In particular, the first device 100 requests the second device 120 to connect thereto if the Bluetooth communication is enabled in the first device 100. If a connection acceptance signal is received from the second device 120, the first device 100 establishes the connection based on the second short distance communication to the second device 120.

Referring to operation S204 of FIG. 2, the first device 100 controls the second device 120 via the second short distance communication. In particular, if the connection based on the second short distance communication is established between the first device 100 and the second device 120, the first device 100 executes the application based on the application information which relates to the second device 120 which is received in operation S202, and controls the second device 120 while performing data communication with the second device 120 via the second short distance communication.

Figure 4:
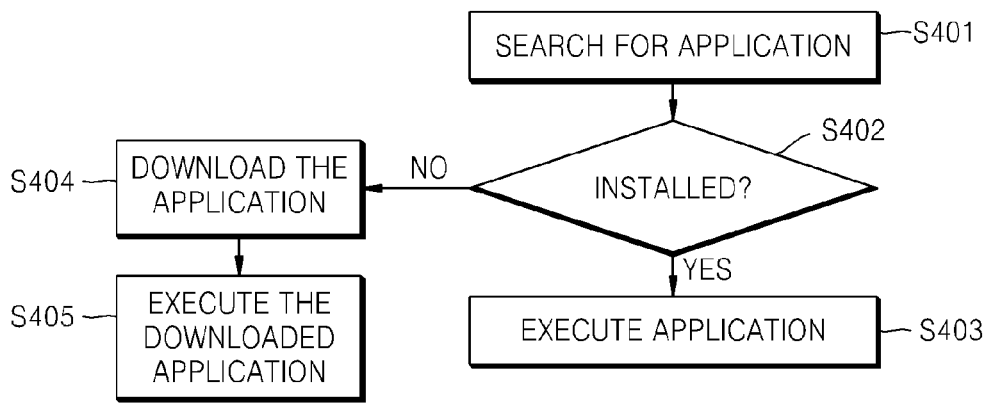
FIG. 4 is a detailed flowchart which illustrates a process for executing an application in an operation of controlling the second device of FIG. 2.

FIG. 4 is a flowchart which illustrates an execution of an application in operation S204.

In operation S401, the first device 100 searches for an application therein based on the received application information. If the first device 100 determines that the application is installed therein in operation S402, the first device 100 executes the application in operation S403.

When the application is installed in the first device 100, the first device 100 may execute the application by reflecting past history information which relates to a connection between the first device 100 and the second device 120. The past history information may include progress status information, such as, for example, any one or more of a maximum score, a game level, used character information, etc. when the application is a game, but is not limited thereto. When the past history information includes the maximum score, the application which is executed by the first device 100 may display information which relates to the above-described maximum score.

If the first device 100 determines that the application is not installed therein in operation S402, the first device 100 downloads the application from the server 130 in operation S404. In operation S405, the first device 100 executes the downloaded application.

Referring to operation S204 of FIG. 2, if the first device 100 executes the application in operation S204, the first device 100 controls the second device 120 via the second short distance communication based on an operation of the application. For example, if the executed application is a musical instrument playing application, and the second device 120 includes piano keys, the first device 100 may control an operation of the piano keys while executing the musical instrument playing application.

FIGS. 2, 3, and 4 show a case in which the application information is received from the second device 120. However, the application execution method according to an exemplary embodiment may not receive the application information from the second device 120, recognize the second device 120 via the first short distance communication, and then automatically search for the application by the first device 100 based on the recognized information which relates to the second device 120.

Figure 5:
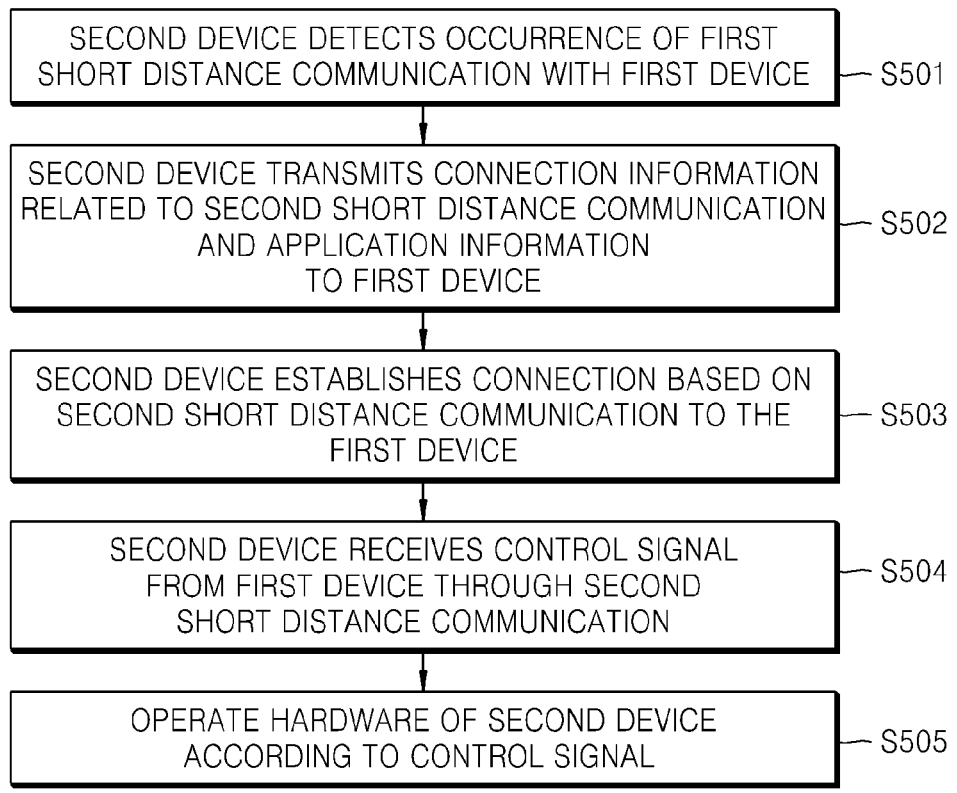
FIG. 5 is a flowchart which illustrates an application execution method which is performable by using a second device, according to an exemplary embodiment.

FIG. 5 is a flowchart of an application execution method which is performable by using the second device 120, according to an exemplary embodiment. FIG. 5 shows a case in which the first short distance communication between the first device 100 and the second device 120 uses an NFC mode.

In operation S501, the second device 120 detects an occurrence of the first short distance communication with the first device 100. For example, when the first short distance communication is based on the NFC mode, as described with reference to FIG. 2, if a distance between the first device 100 and the second device 120 is within a first short distance communication radius, the second device 120 may detect the occurrence of the first short distance communication with the first device 100.

In operation S502, the second device 120 transmits the connection information which relates to the second short distance communication and application information to the first device 100. In this regard, as described with reference to the first device 100, the second device 120 may not transmit the application information to the first device 100.

In operation S503, the second device 120 establishes the connection of the second short distance communication to the first device 100 by using information which is received from the first device 100. In case of that the second short distance communication mode which is available with respect to the second device 120 should use the relay 110, the information which is received from the first device 100 may include connection information which relates to the relay 110. In case of that the second short distance communication mode which is available with respect to the second device 120 does not use the relay 110, the information which is received from the first device 100 may include a connection request signal based on the second short distance communication mode enabled by the first device 100.

In operation S504, the second device 120 receives a control signal from the first device 100 via the second short distance communication which is established between the first device 100 and the second device 120. In operation S505, the second device 120 operates hardware thereof based on the control signal. In operation S505, the second device 120 may operate hardware and software of the second device 120 based on the received control signal. Operations S504 and S505 may be understood as referring to operating the second device 120 based on the control signal which is received from the first device 100 while the second device 120 and the first device 100 execute an application.

Figure 6:
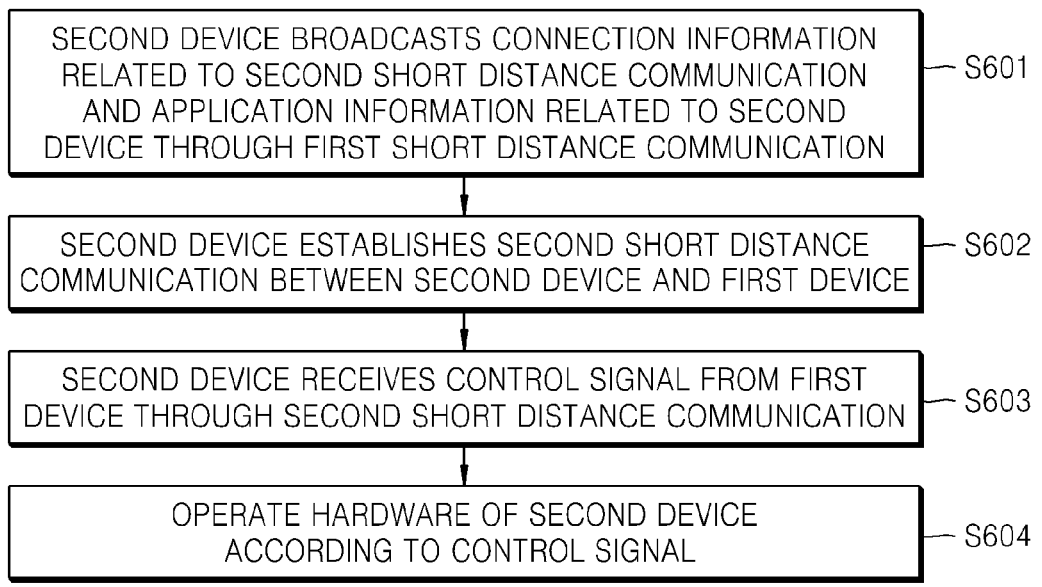
FIG. 6 is a flowchart which illustrates an application execution method which is performable by using a second device, according to another exemplary embodiment.

FIG. 6 is a flowchart which illustrates an application execution method which is performable by using the second device 120, according to another exemplary embodiment. FIG. 6 shows a case in which the first short distance communication between the first device 100 and the second device 120 uses a BLE communication mode.

In operation S601, the second device 120 broadcasts the connection information which relates to the second short distance communication and application information which relates to the second device 120 via the first short distance communication. The first short distance communication uses the BLE communication mode.

In operation S602, the second device 120 establishes the connection based on the second short distance communication to the first device 100 by using information which is received from the first device 100. In case of that the second short distance communication mode which is available with respect to the second device 120 should use the relay 110, the information which is received from the first device 100 may include connection information which relates to the relay 110. In case of that the second short distance communication which is available with respect to the second device 120 does not use the relay 110, the information which is received from the first device 100 may include a connection request signal based on the second short distance communication which is enabled by the first device 100.

In operation S603, the second device 120 receives a control signal from the first device 100 via the second short distance communication which is established between the first device 100 and the second device 120. In operation S604, the second device 120 operates hardware thereof based on the control signal. Operation S604 may operate hardware and software of the second device 120 based on the received control signal.

Figure 7:
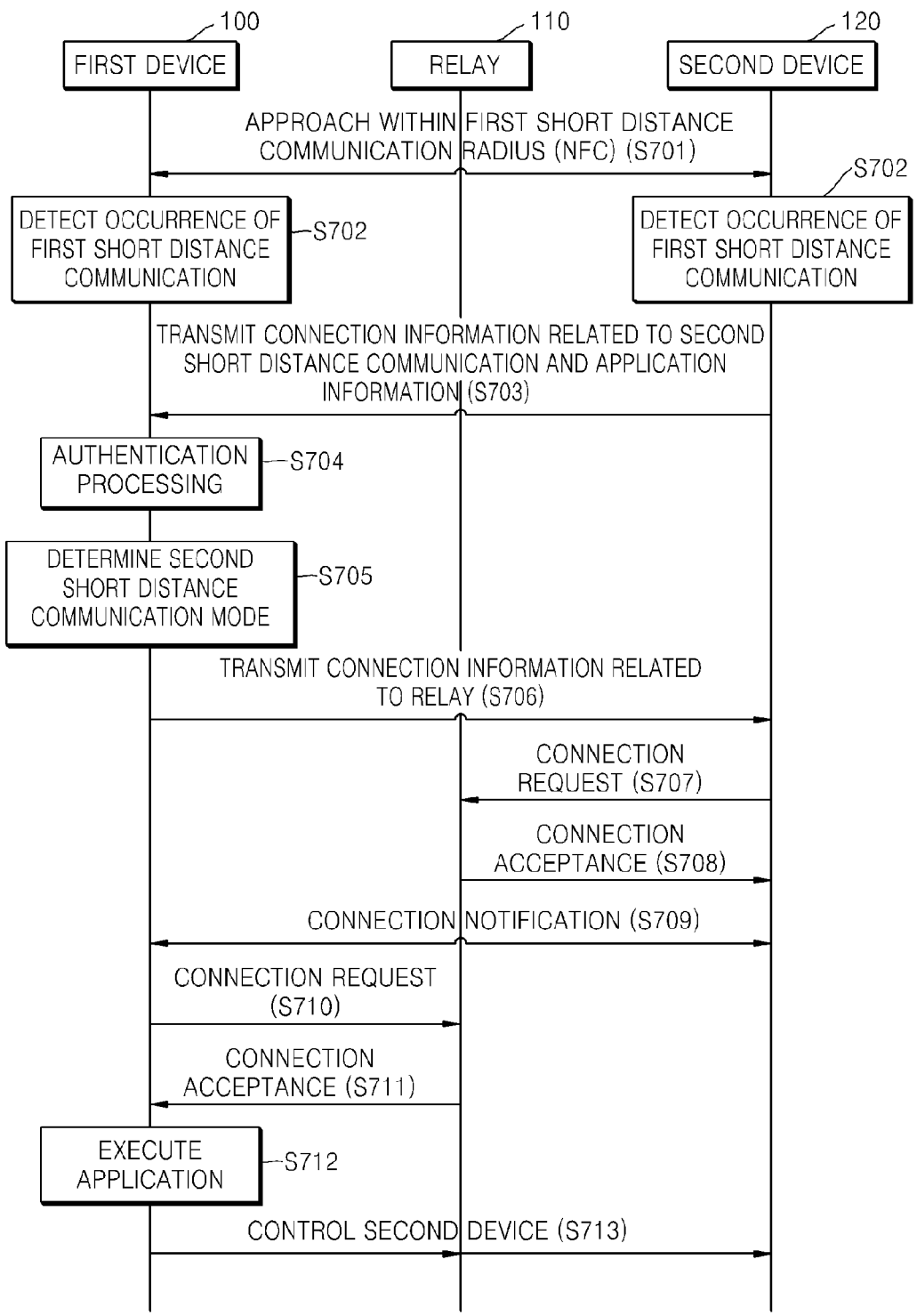
FIG. 7 is a flowchart which illustrates an application execution method, according to an exemplary embodiment.

FIG. 7 is a flowchart which illustrates an application execution method, according to an exemplary embodiment. FIG. 7 shows a case in which first short distance communication is performed by using an NFC mode, and second short distance communication is a communication mode which uses the relay 110.

In operation S701, because a distance between the first device 100 and the second device 120 is closer to a first short distance communication radius, in operation S702, the first device 100 and the second device 120 respectively detect an occurrence of the first short distance communication.

In operation S703, the second device 120 transmits the connection information which relates to the second short distance communication and application information which relates to the second device 120 to the first device 100 via NFC.

In operation S704, the first device 100 performs authentication processing with respect to the second device 120. Authentication processing may be performed by authenticating authentication information which is received from the second device 120. The authentication information which is received from the second device 120 may be previously set in each of the first device 100 and the second device 120. Thus, the authentication information may be received from the second device 120 in operation S703. If the authentication information is not received from the second device 120 in operation S703, and when an exemplary embodiment is implemented not to perform authentication processing with respect to the second device 120, operation S704 may be skipped.

When an exemplary embodiment is implemented to perform authentication processing with respect to the second device 120, if the authentication information is not received from the second device 120 or wrong authentication information is received from the second device 120, the first device 100 may not perform a next operation.

In operation S705, the first device 100 determines the second short distance communication mode that can be performed by the second device 120 based on the received connection information which relates to the second short distance communication. The determining the second short distance communication mode is performed as described with reference to operation S301 of FIG. 3.

FIG. 7 shows a case in which the second short distance communication mode that can be performed by the second device 120 uses the relay 110. Thus, in operation S706, the first device 100 transmits connection information which relates to the relay 110 to the second device 120. FIG. 7 shows a case in which the first device 100 is not connected to the relay 110 and stores the connection information which relates to the relay 110 therein.

In operation S707, the second device 120 requests the relay 110 to connect thereto by using the received connection information which relates to the relay 110. In operation S708, if a connection acceptance signal is received from the relay 110, in operation S709, the second device 120 transmits a connection notification which indicates that the second device 120 is connected to the relay 110 to the first device 100.

In operation S710, the first device 100 requests the relay 110 to connect thereto by using the connection information which relates to the relay 110. In operation S711, if a connection acceptance signal is received from the relay 110, in operation S712, the first device 100 executes an application. The executing the application may be performed as illustrated in the flowchart of FIG. 4.

In operation S713, the first device 100 controls the second device 120 via the relay 110 based on the executed application.

Figure 8:
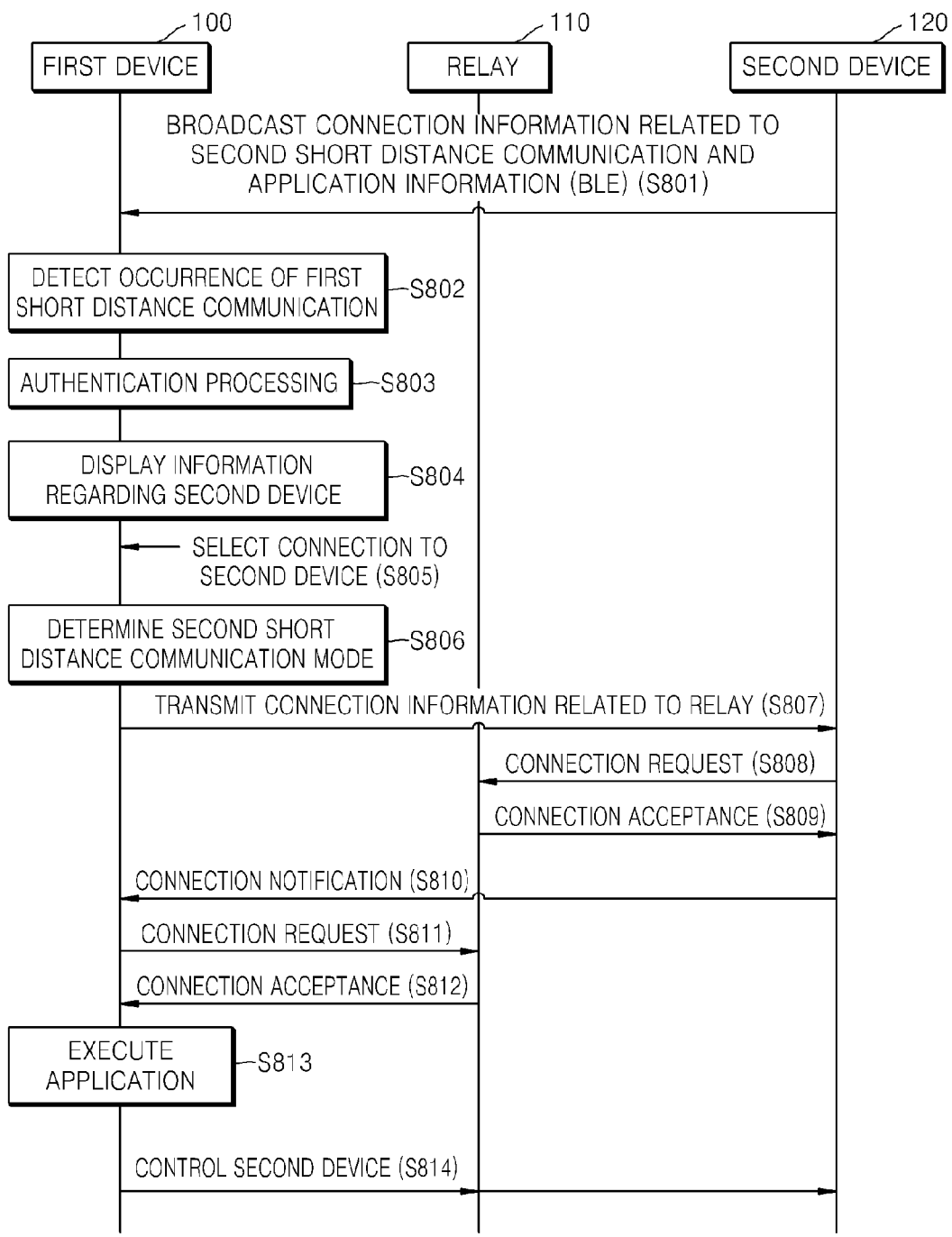
FIG. 8 is a flowchart which illustrates an application execution method, according to another exemplary embodiment.

FIG. 8 is a flowchart which illustrates an application execution method, according to another exemplary embodiment. FIG. 8 shows a case in which first short distance communication is performed by using a BLE communication mode, and second short distance communication is performed by using the relay 110.

In operation S801, because the first device 100 receives the connection information which relates to the second short distance communication connection information and application information which relates to the second device 120 which is broadcast from the second device 120, in operation S802, the first device 100 detects an occurrence of the first short distance communication. Although operations S801 and S802 are shown as different operations for the convenience of explanation, they may be understood to be concurrently performed. In particular, the first device 100 may detect the occurrence of the first short distance communication concurrently with receiving a signal broadcast from the second device 120.

In operation S803, the first device 100 performs authentication processing with respect to the second device 120. Authentication processing may be performed by authenticating authentication information which is received from the second device 120. The authentication information which is received from the second device 120 may be previously set in each of the first device 100 and the second device 120. Thus, the authentication information may be received from the second device 120 in operation S801. If the authentication information is not received from the second device 120 in operation S801, and when an exemplary embodiment is implemented not to perform authentication processing with respect to the second device 120, operation S803 may be skipped.

When an exemplary embodiment is implemented to perform authentication processing with respect to the second device 120, if the authentication information is not received from the second device 120 or wrong authentication information is received from the second device 120, the first device 100 may not perform a next operation.

In operation S804, the first device 100 displays information which relates to the second device 120. To this end, the second device 120 may transmit the information which relates to the second device 120 to the first device in operation S801.

After the first device 100 detects the occurrence of the first short distance communication in operation S802, the first device 100 may be implemented to receive the above-described authentication information and the information which relates to the second device 120 based on an information request from the first device 100 to the second device 120.

In operation S805, if user information which relates to selecting a connection to the second device 120 is received based on the displayed information which relate to the second device 120, in operation S806, the first device 100 determines the second short distance communication mode that may be performed by the second device 120 by using the connection information which relates to the second short distance communication. The determining of the second short distance communication mode is performed as described with reference to operation S301 of FIG. 3.

FIG. 8 shows a case in which the second short distance communication mode that may be performed by the second device 120 uses the relay 110. Thus, in operation S807, the first device 100 transmits connection information which relates to the relay 110 to the second device 120. FIG. 8 shows a case in which the first device 100 is not connected to the relay 110 and stores the connection information which relates to the relay 110 therein.

In operation S808, the second device 120 requests the relay 110 to connect thereto by using the received connection information which relates to the relay 110. In operation S809, if a connection acceptance signal is received from the relay 110, in operation S810, the second device 120 transmits a connection notification which indicates that the second device 120 is connected to the relay 110 to the first device 100.

In operation S811, the first device 100 requests the relay 110 to connect thereto by using the connection information which relates to the relay 110. In operation S812, if a connection acceptance signal is received from the relay 110, in operation S813, the first device 100 executes an application. The executing of the application may be performed as illustrated in the flowchart of FIG. 4.

In operation S814, the first device 100 controls the second device 120 via the relay 110 based on the executed application.

Figure 9:
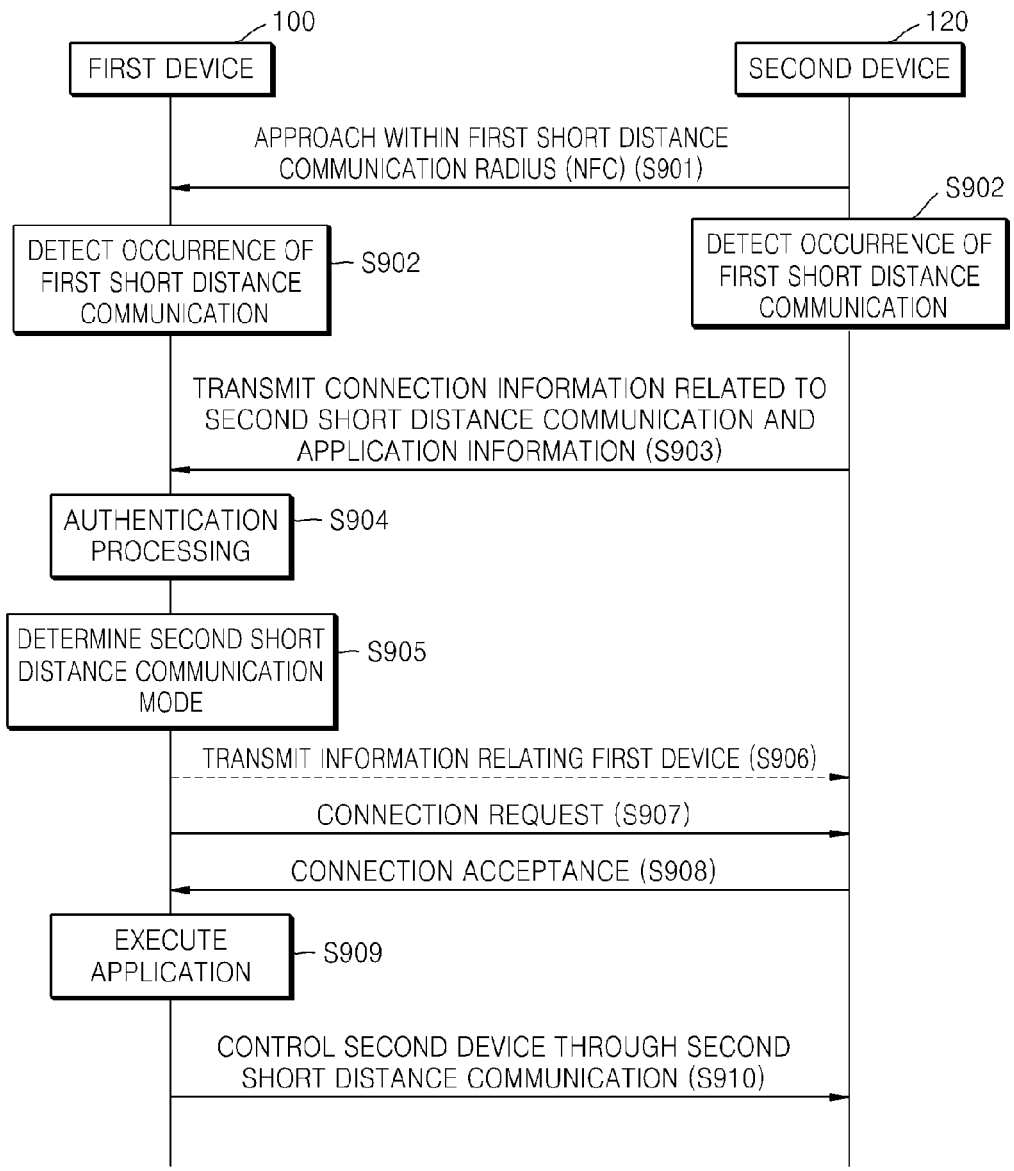
FIG. 9 is a flowchart which illustrates an application execution method, according to another exemplary embodiment.

FIG. 9 is a flowchart which illustrates an application execution method, according to another exemplary embodiment. FIG. 9 shows a case in which first short distance communication is performed by using an NFC mode, and second short distance communication is performed via direct communication between devices, and not by using the relay 110.

In operation S901, because a distance between the first device 100 and the second device 120 is closer to a first short distance communication radius, in operation S902, the first device 100 and the second device 120 detect an occurrence of the first short distance communication.

In operation S903, the second device 120 transmits the connection information which relates to the second short distance communication and application information which relates to the second device 120 to the first device 100 via NFC.

In operation S904, the first device 100 performs authentication processing with respect to the second device 120. Authentication processing may be performed by authenticating authentication information which is received from the second device 120. The authentication information may be previously set in each of the first device 100 and the second device 120. The authentication information may be received from the second device 120 in operation S903. If the authentication information is not received from the second device 120 in operation S903, and when an exemplary embodiment is implemented not to perform authentication processing with respect to the second device 120, operation S904 may be skipped.

When an exemplary embodiment is implemented to perform authentication processing with respect to the second device 120, if the authentication information is not received from the second device 120 or wrong authentication information is received from the second device 120, the first device 100 may not perform a next operation.

In operation S905, the first device 100 determines the second short distance communication mode that may be performed by the second device 120 by using the connection information which relates to the second short distance communication. The determining of the second short distance communication mode is performed as described with reference to operation S301 of FIG. 3.

FIG. 9 shows a case in which the second short distance communication mode that may be performed by the second device 120 uses a direct communication mode between devices, and does not use the relay 110. Thus, in operation S906, the first device 100 may transmit information which relates to the first device 100 and which is necessary for a request for direct communication between devices to the second device 120 via NFC. Thus, the second device 120 may attempt to perform direct communication between devices with the first device 100 first by using the information which relates to the first device 100.

The application execution method of FIG. 9 may be implemented not to perform operation S906 such that the direct communication between devices may be attempted by only the first device 100.

In operation S907, the first device 100 requests the second device 120 for connection therebetween by using the received connection information which relates to the second short distance communication mode that may be performed by the second device 120. In operation S908, if a connection acceptance signal is received from the second device 120, in operation S909, the first device 100 executes an application. The executing of the application may be performed as illustrated in the flowchart of FIG. 4.

In operation S910, the first device 100 controls the second device 120 via the direct communication between devices based on the executed application.

Figure 10:
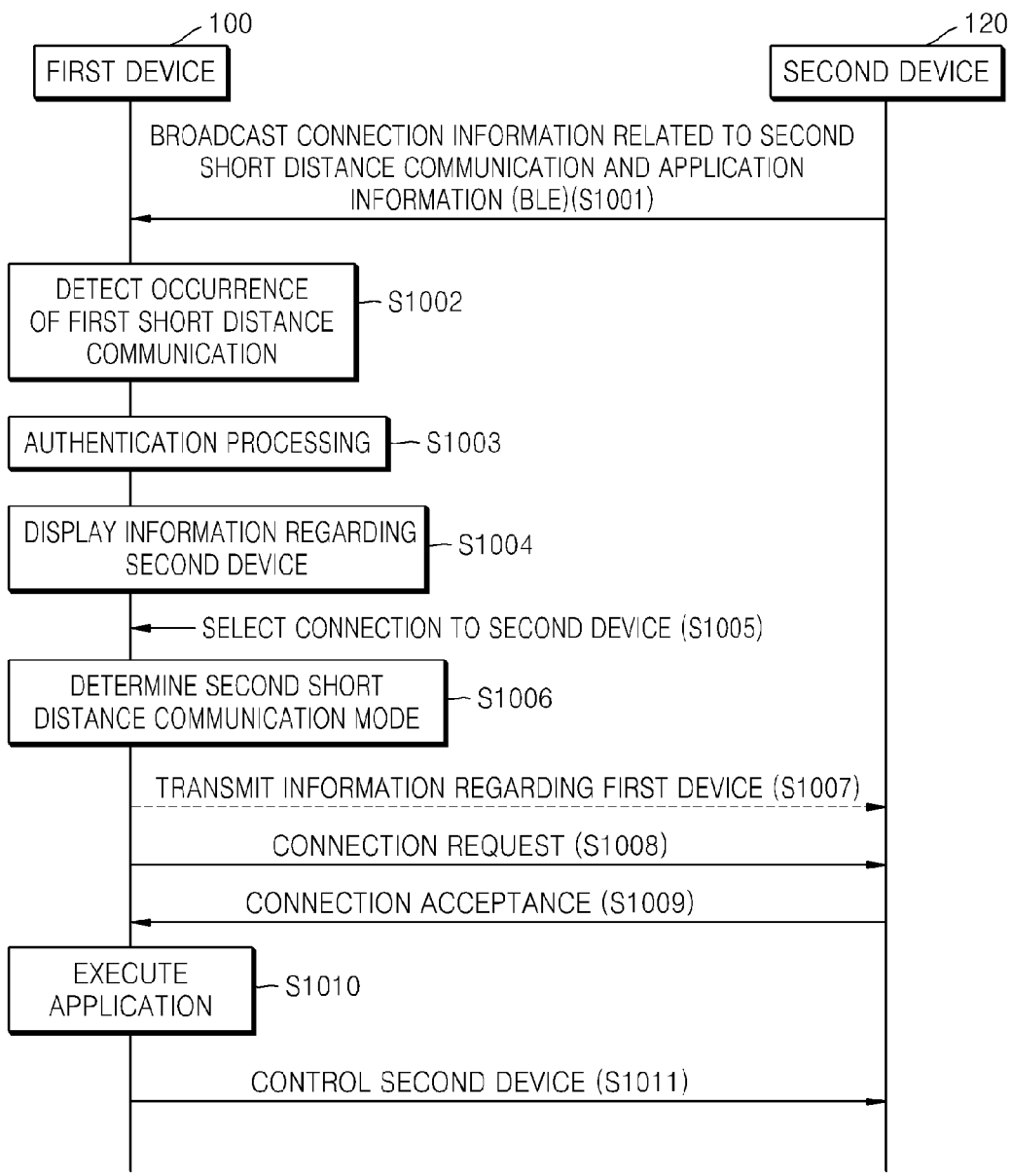
FIG. 10 is a flowchart which illustrates an application execution method, according to another exemplary embodiment.

FIG. 10 is a flowchart which illustrates an application execution method, according to another exemplary embodiment. FIG. 10 shows a case in which first short distance communication is performed by using a BLE communication mode, and second short distance communication is performed via direct communication between devices, and not by using the relay 110.

In operation S1001, because the first device 100 receives the connection information which relates to the second short distance communication and application information which relates to the second device 120 broadcast from the second device 120 via BLE communication, in operation S1002, the first device 100 detects an occurrence of the first short distance communication. Although operations S1001 and S1002 are shown as different operations for convenience of explanation, they may be understood to be concurrently performed. In particular, the first device 100 may detect the occurrence of the first short distance communication concurrently with receiving a signal which is broadcast from the second device 120. The second device 120 may not transmit the application information in operation S1001.

In operation S1003, the first device 100 performs authentication processing with respect to the second device 120. Authentication processing may be performed by authenticating authentication information which is received from the second device 120. The authentication information may be previously set in each of the first device 100 and the second device 120. The authentication information may be received from the second device 120 in operation S1001. If the authentication information is not received from the second device 120 in operation S1001, and when an exemplary embodiment is implemented not to perform authentication processing with respect to the second device 120, operation S1003 may be skipped.

When an exemplary embodiment is implemented to perform authentication processing with respect to the second device 120, if the authentication information is not received from the second device 120 or wrong authentication information is received from the second device 120, the first device 100 may not perform a next operation.

In operation S1004, the first device 100 displays information which relates to the second device 120. To this end, the second device 120 may transmit the information which relates to the second device 120 to the first device in operation S1001.

After the first device 100 detects the occurrence of the first short distance communication in operation S1002, the first device 100 may be implemented to receive the above-described authentication information and the information which relates to the second device 120 based on an information request from the first device 100 to the second device 120.

In operation S1005, if a user input which relates to a selection of a connection to the second device 120 is received based on the displayed information which relates to the second device 120, in operation S1006, the first device 100 determines the second short distance communication mode that may be performed by the second device 120 by using the connection information which relates to the second short distance communication mode. The determining of the second short distance communication mode is performed as described above with reference to operation S301 of FIG. 3.

FIG. 10 shows a case in which the second short distance communication mode that may be performed by the second device 120 uses direct communication between devices, and does not use the relay 110. Thus, in operation S1007, the first device 100 may transmit information which relates to the first device 100 which is necessary for a request for direct communication between devices to the second device 120 via BLE communication. Thus, the second device 120 may attempt to perform direct communication between devices with the first device 100 first by using the information which relates to the first device 100.

However, the application execution method of FIG. 10 may be implemented not to perform operation S1007 such that direct communication between devices may be attempted by only the first device 100.

In operation S1008, the first device 100 requests the second device 120 for connection therebetween by using the received connection information which relates to the second short distance communication mode that may be performed by the second device 120. In operation S1009, if a connection acceptance signal is received from the second device 120, in operation S1010, the first device 100 executes an application. The executing of the application may be performed as illustrated in the flowchart of FIG. 4.

In operation S1011, the first device 100 controls the second device 120 via the direct communication between the devices based on the executed application.

FIG. 11 is a block diagram of the first device 100, according to an exemplary embodiment.

Referring to FIG. 11, the first device 100 includes an information input and output unit 1110, a first short distance communication unit 1120, a second short distance communication unit 1130, a processor 1140, a memory 1150, a power supply 1160, and a port 1170. However, the first device 100 may include more or less elements than those shown in FIG. 11.

For example, the first device 100 may be configured not to include the port 1170, or may be configured to include a camera module or/and a global positioning system (GPS) module. However, elements that are or are not included in the first device 100 are not limited thereto.

The first short distance communication unit 1120 and the second short distance communication unit 1130 may also include more or less elements than those shown in FIG. 11, or may be coupled to each other or separated from each other.

In particular, a BLE module 1122 which is included in the first short distance communication unit 1120 and a Bluetooth communication unit 1132 which is included in the second short distance communication unit 1130 may be configured as a single chip set. In this case, the chip set may operate in a dual mode to drive the BLE module 1122 when the first device 100 is in a first short distance communication mode, and to drive the Bluetooth communication unit 1132 when the first device 100 is in a second short distance communication mode.

A wireless LAN communication unit 1131 may include both a function of direct communication between devices (for example, a WiFi direct function) and a communication function which uses the relay 110 (for example, an infrastructure mode wireless LAN function) or may include only the communication function which uses the relay 110. When the wireless LAN communication unit 1131 includes both the function of direct communication between devices and the communication function which uses the relay 110, the wireless LAN communication unit 1131 may selectively operate the function of direct communication between devices and the communication function which uses the relay 110 based on a second short distance communication mode that may be performed by the second device 120.

For example, when the second short distance communication mode that may be performed by the second device 120 does not use the relay 110, the wireless LAN communication unit 1131 performs the function of direct communication between devices. When the second short distance communication mode that may be performed by the second device 120 uses the relay 110, the wireless LAN communication unit 1131 performs the communication function which uses the relay 110.

The information input and output unit 1110 receives user input information and output information which relates to the first device 100. For example, the user input information may include any one or more of touch based input information, physical button control based input information, user gesture based input information, user voice recognition based input information, face recognition based input information, and remote controller (not shown) based input information, but is not limited thereto.

The information input and output unit 1110, according to an exemplary embodiment, may display information which relates to the second device 120 as described above in relation to operation S804 of FIG. 8 and operation S1004 of FIG. 10, and may receive the user input information which relates to a selection of a connection to the second device 120 as described above in relation to operation S805 of FIG. 8 and operation S1005 of FIG. 10. The information input and output unit 1110 may output or reproduce information based on an execution of an application and receive the user input information based on the outputting or reproducing information as described above in relation to operation S712 of FIG. 7, operation S813 of FIG. 8, operation S909 of FIG. 9, and operation S1010 of FIG. 10.

The information input and output unit 1110 may include any one or more of a dial, a slider switch, a joystick, a click wheel, a touch pad, a touch screen, a button, a microphone, a speaker, sensors, a display light, a key pad, a display device, a scroll wheel, and a wireless communication based remote signal receiver, etc., but is not limited thereto. A camera that is not shown in FIG. 11 may be included in the information input and output unit 1110 based on information obtained by the camera. The information input and output unit 1110 may include a user interface and/or a graphical user interface.

The first short distance communication unit 1120 performs first short distance communication between the first device 100 and the second device 120 as described above with reference to FIG. 1 according to an exemplary embodiment. The first short distance communication unit 1120 includes an NFC module 1121 and the BLE module 1122, but is not limited thereto. The elements included in the first short distance communication unit 1120 may be coupled to the elements included in the second short distance communication unit 1130 in a hardware manner, and may maintain a first short distance communication function even though the first short distance communication unit 1120 is coupled to the second short distance communication unit 1130 in the hardware manner.

The NFC module 1121 may perform a read/write mode with respect to an NFC module which is included in the second device 120 or exchange data with the NFC module of the second device 120 via mutual communication in a P2P mode, because a distance between the first device 100 and the second device 120 is within a first short distance communication radius. When the first short distance communication radius is based on an NFC mode as described above with reference to FIG. 1, although the first short distance communication radius is generally 10 cm, because it may be up to a maximum of 20 cm, the first short distance communication radius based on the NFC mode is not limited thereto.

When the NFC module 1121 performs the read/write mode, the NFC module which is included in the second device 120 may be configured as a tag in a manual mode. When the NFC module 1121 performs the read/write mode or in the P2P mode, the NFC module 1121 may read, for example, connection information which relates to the second short distance communication mode and application information which relates to the second device 120, from the NFC module which is included in the second device 120, and write connection information which relates to the relay 110 in the NFC module which is included in the second device 120. Information stored in the NFC module which is included in the second device 120 may not include the application information which relates to the second device 120.

The BLE module 1122 may receive a signal which is broadcast from the second device 120. When the BLE module 1122 operates, it may be understood that the BLE module 1122 of the first device 100 operates in a slave mode (i.e., as a peripheral device) of the second device 120, and a BLE module of the second device 120 operates in a master mode (i.e., as a central device) of the first device 100.

The signal which is broadcast via the BLE module 1122 may include the connection information which relates to the second short distance communication mode that may be performed by the second device 120 and the application information which relates to the second device 120, information which relates to the second device 120, and authentication information which relates to the second device 120 as described above with reference to FIG. 1, but is not limited thereto. The above-described broadcast signal may not include some of the above-described information. The information which relates to the second device 120 may include any one or more of a MAC address of the second device 120, a Bluetooth address thereof, a product name thereof, profile information thereof, etc., but is not limited thereto.

The second short distance communication unit 1130 may perform second short distance communication with the second device 120 according to an exemplary embodiment as described above with reference to FIG. 1. To this end, the second short distance communication unit 1130 may include the wireless LAN communication unit 1131 and the Bluetooth communication unit 1132, but is not limited thereto. For example, the second short distance communication unit 1130 may further include a Zigbee communication module and a UWB communication module, etc. and/or may include one of the wireless LAN communication unit 1131 and the Bluetooth communication unit 1132.

The wireless LAN communication unit 1131 may be configured to selectively perform a function of direct communication between devices (for example, a WiFi direct function included in an ad-hoc mode wireless LAN) and a communication function which uses the relay 110 (for example, an infrastructure mode wireless LAN function), or may be configured to perform the function of direct communication between devices or the communication function which uses the relay 110 as described above. The wireless LAN communication unit 1131 may operate a WiFi mode as a dual mode as described above.

The Bluetooth communication unit 1132 may perform second short distance communication between the first device 100 and the second device 120 by using classic Bluetooth communication (i.e., direct communication between devices). However, the Bluetooth communication unit 1132 may be configured as a single chip which contains the BLE module 1122 and classic Bluetooth communication functionality as described above in order to selectively perform the BLE module 1122 and the classic Bluetooth communication.

The processor 1140 may usually control a general operation of the first device 100. Thus, the processor 1140 may be referred to as a controller. The processor 1140 may recognize the second device 120 via first short distance communication with the second device 120 which is connected to the first device, may connect to the second device 120 by using the second short distance communication mode, and may execute an application which relates to the second device 120. The processor 1140 may control a user interface which is based on the information input and output unit 1110 and control the power supply 1160. The processor 1140 may monitor a connection status of the port 1170, and, if the connection status is detected, may perform a corresponding operation.

The memory 1150 may store a program and data for performing the application execution method according to an exemplary embodiment. The program may be based on the flowcharts shown in FIGS. 2, 3, and 4 and the flowchart of the first device 100 which is shown in FIGS. 7, 8, 9, and 10. Accordingly, the processor 1140 may execute the program stored in the memory 1150 and perform the operations of the first device 100 in accordance with the flowcharts shown in FIGS. 2, 3, and 4 and FIGS. 7, 8, 9, and 10.

The data may include, for example, any one or more of connection information which relates to the relay 110 that was connected or is connectable to the first device 100, a Bluetooth address of the first device 100, a MAC address thereof, an IP address thereof, profile information thereof, a product name thereof, etc., but is not limited thereto.

The memory 1150 may store the connection information which relates to the second short distance communication mode that may be performed by the second device 120, application information which relates to the second device 120, and information which relates to the second device 120 which is received from the second device 120. The information which relates to the second device 120 may be stored based on a registration request of the second device 120 or when the information which relates to the second device 120 is received.

The program stored in the memory 1150 according to an exemplary embodiment may include, for example, at least one of a management program of the second device 120, an application management program, and a service management program, but is not limited thereto. The management program of the second device 120 may manage a connection and a disconnection between the second device 120 and the first device 100, and control and manage communication between the second device 120 and an application which is executed by the first device 100. The application management program may launch or search for an application which relates to the second device 120. The service management program may process a command language with respect to an application being executed and the second device 120.

The memory 1150 may include at least one type of storage medium, such as any one or more of a flash memory type, a hard disk type, a multimedia card micro type, a card type memory (for example, SD, XD memory, etc.), random access memory (RAM), static random access memory (SRAM), read only memory (ROM), electronically erasable programmable ROM (EEPROM), programmable ROM (PROM) magnetic memory, and an optical disk.

If the processor 1140 recognizes that a connection event which relates to the second device 120 via the port 1170 or the first short distance communication unit 1120 takes place, the processor 1140 may execute the above-described management program of the second device 120, application management program, and service management program, and control the first short distance communication unit 1120, the second short distance communication unit 1130, the information input and output unit 1110, the power supply 1160, and the port 1170.

The power supply 1160 supplies power to a hardware component which is included in the first device 100 in accordance with a control of the processor 1140 based on an operating system stored in the memory 1150 and the above-described programs. For example, if a power saving mode control signal is received from the processor 1140 which control signal relates to power supplied to perform an output function of the information input and output unit 1110, the power supply 1160 supplies limited power such that the output function of the information input and output unit 1110 operates in a power saving mode.

When the second device 120 is connected to the port 1170, the port 1170 provides a communication channel between the first device 100 and the second device 120. The port 1170 may be a physical port which supports a specific communication channel. For example, the port 1170 may include a physical port which relates to a wired channel, such as, for example, a universal serial bus (USB) 1171 and/or a universal asynchronous receiver/transmitter (UART) 1172, but is not limited thereto. When the second device 120 is connected to the first device 100 via the port 1170, the first device 100 and the second device 120 may execute an application while transmitting and receiving data by wire.

Figure 12:
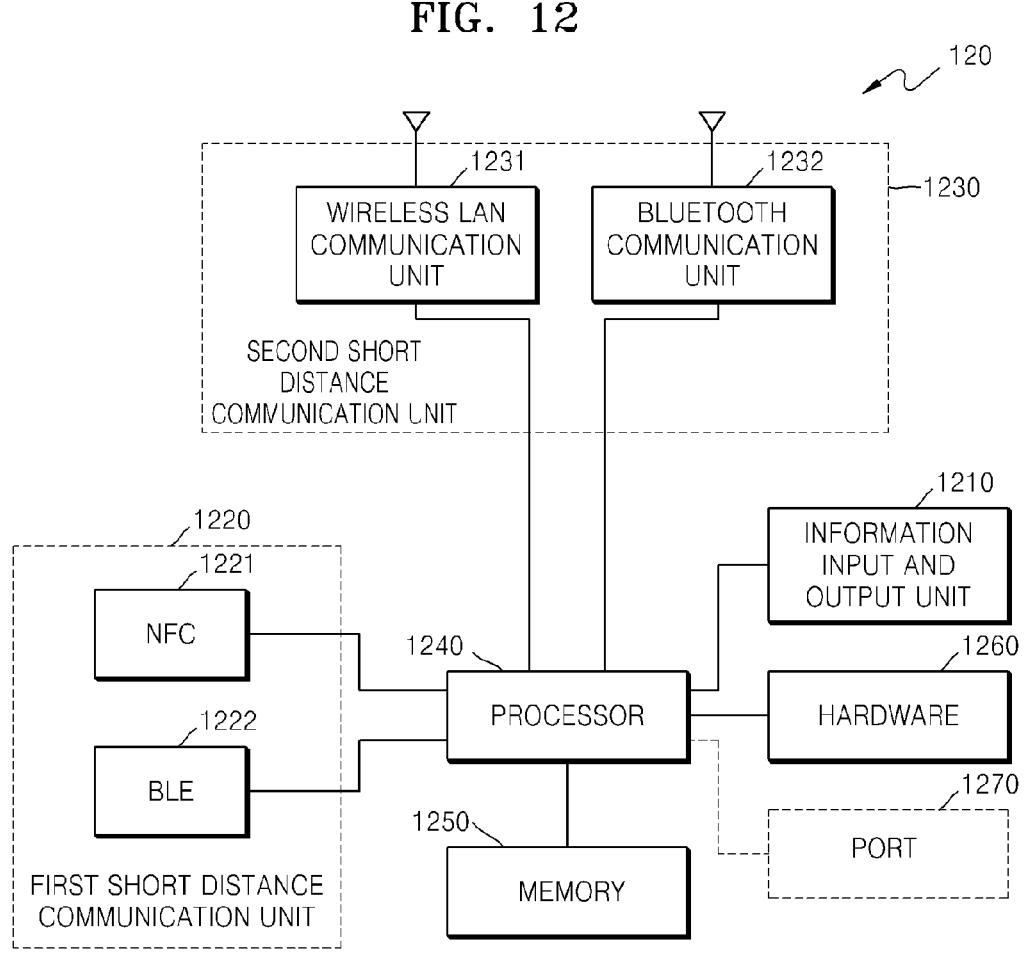
FIG. 12 is a block diagram of a second device, according to an exemplary embodiment.

FIG. 12 is a block diagram of the second device 120, according to an exemplary embodiment. FIG. 12 shows a case in which first short distance communication is performed by using one of an NFC mode and a BLE communication mode, and second short distance communication is performed by using one of a Bluetooth communication mode and a wireless LAN communication mode.

Referring to FIG. 12, the second device 120 includes an information input and output unit 1210, a first short distance communication unit 1220 which includes an NFC module 1221 and a BLE module 1222, a second short distance communication unit 1230 which includes a wireless LAN communication unit 1231 and a Bluetooth communication unit 1232, a processor 1240, a memory 1250, hardware 1260 of the second device 120, and a port 1270.

When the second device 120 is configured as shown in FIG. 12, user input information which relates to selecting a first short distance communication mode and a second short distance communication mode via the information input and output unit 1210 may be received. The NFC module 1221 and the BLE module 1222 which are included in the first short distance communication unit 1220 may be selectively driven and the wireless LAN communication unit 1231 and the Bluetooth communication unit 1232 which are included in the second short distance communication unit 1230 may be selectively driven via a communication mode that is set in the processor 1240 based on the received user input information.

The information input and output unit 1210 receives the user input information and outputs information which is output from the second device 120 in conjunction with an execution of an application. The user input information may include, for example, any one or more of touch based input information, physical button control based input information, user gesture based input information, user voice recognition based input information, face recognition based input information, and remote controller (not shown) based input information, but is not limited thereto.

The information input and output unit 1210 may be configured according to input information that may be received. For example, if the application is executed and there is no user input information which is received based on the second device 120, and user input information is necessary to request a connection based on the second short distance communication between the first device 100 and the second device 120, the information input and output unit 1210 may include a physical button which is capable of requesting the connection between the first device 100 and the second device 120 based on the second short distance communication and a function block which is capable of outputting information which requires output from among Information received from the first device 100 in conjunction with the application which is executed by the first device 100 after the connection based on the second short distance communication between the first device 100 and the second device 120 is established.

The NFC module 1221 may be configured as an NFC tag, as a chip for reading/writing from/to the NFC module 1121 of FIG. 11, and/or to perform bi-directional data communication with the NFC module 1121 in a P2P mode, as described above with reference to the NFC module 1121.

The wireless LAN communication unit 1231 may be configured to selectively perform direct communication between devices and communication which uses the relay 110, to perform only direct communication between devices, or to perform only the communication which uses the relay 110, similarly as described above with respect to the wireless LAN communication unit 1131 of FIG. 11.

The memory 1250 may store programs and data which are necessary for controlling a general operation of the second device 120 in the processor 1240. The programs may include a program for performing the application execution method according to an exemplary embodiment. The programs, which are for performing the application execution method and are stored in the memory 1250, may include a communication program for communicating between the first device 100 and the second device 120 and a program for controlling the hardware 1260 of the second device 120 based on the application which is executed by the first device 100, but is not limited thereto.

The memory 1250 may store programs for performing the application execution method in accordance with respective communication modes. Accordingly, the programs may be executed based on a communication mode which is determined by the processor 1240.

The memory 1250 may include at least one type of storage medium, such as, for example, any one or more of a flash memory type, a hard disk type, a multimedia card micro type, a card type memory (for example, SD, XD memory, etc.), RAM, SRAM, ROM, EEPROM, PROM magnetic memory, and an optical disk.

The data stored in the memory 1250 may include connection information which relates to the second short distance communication mode that may be performed by the second device 120, application information which relates to the second device 120, information which relates to the second device 120, and authentication information which relates to the second device 120, but is not limited thereto.

The hardware 1260 of the second device 120 may be defined based on a function of the second device 120. For example, if the second device 120 is a smart watch which operates in accordance with an application which links with the first device 100, the hardware 1260 of the second device 120 may include a physical function unit (for example, a GPS module, a microphone, a speaker, etc.) which is necessary for performing a function of the smart watch which links with the application which is executed by the first device 100.

If the second device 120 is an insulin resistance and sensitivity measurement device which links with an insulin monitoring application which is executed by the first device 100, the hardware 1260 of the second device 120 may include the insulin resistance and sensitivity measurement device, but is not limited thereto. The hardware 1260 of the second device 120 may include various sensors which are based on the function of the second device 120.

When the application which is executed by the first device 100 is a musical instrument application, and the second device 120 is a keyboard or guitar, the hardware 1260 of the second device 120 may include a hardware component which is capable of playing the keyboard or guitar based on a control signal of the first device 100.

When the application which is executed by the first device 100 is a karaoke application, and the second device 120 is a microphone, the hardware 1260 of the second device 120 may include a hardware component which is configured for turning on/off the microphone and/or turning a volume level of the microphone, and, when the second device 120 is a speaker, the hardware 1260 of the second device 120 may include a hardware component which is configured for adjusting a sound output environment, but the hardware component is not limited thereto.

The second device 120 may implement a function which is performed by the hardware 1260 of the second device 120 in a software manner, may minimize the hardware 1260 of the second device 120, or may not include the hardware 1260 of the second device 120. In this case, software is stored in the memory 1250 and may be executed by the processor 1240 based on a control signal which is received from the first device 100.

The port 1270 may include at least one of a USB port and a UART port, similarly as described above with respect to the port 1170 of FIG. 11, but is not limited thereto. The second device 120 may not include the port 1270, which thus is shown in a dotted line in FIG. 12. If the first device 100 and the second device 120 are connected to each other via the port 1270, the first device 100 and the second device 120 may link with each other via a wired communication channel.

When the second device 120 of FIG. 12 performs first short distance communication based on an NFC mode and second short distance communication based on a wireless LAN mode, the second device 120 may include the information input and output unit 1210, the NFC module 1221, the wireless LAN communication unit 1231, the processor 1240, the memory 1250, the hardware 1260 of the second device 120, and the port 1270, but is not limited thereto. For example, the second device 120 may further include a power supply or may not include the port 1270.

The processor 1240 controls a general operation of the second device 120 by executing the programs which are stored in the memory 1250. Thus, the processor 1240 may be referred to as a controller. In particular, the processor 1240 establishes a connection which is based on the second short distance communication between the first device 100 and the second device 120 via the NFC module 1221 in accordance with the application execution method according to an exemplary embodiment. After establishing the connection between the first device 100 and the second device 120 based on the second short distance communication, if the processor 1240 receives a control signal in accordance with the application which is executed by the first device 100, the processor 1240 controls the hardware 1260 of the second device 120.

The programs which are stored in the memory 1250 may include a program which is based on the flowcharts of the second device 120 shown in FIGS. 5, 6, and 7.

When the second device 120 of FIG. 12 performs first short distance communication based on a BLE communication mode and second short distance communication based on the wireless LAN mode, the second device 120 may include the information input and output unit 1210, the BLE module 1222, the wireless LAN communication unit 1231, the processor 1240, the memory 1250, the hardware 1260 of the second device 120, and the port 1270, but is not limited thereto.

The BLE module 1220 broadcasts the connection information which relates to the second short distance communication and related application information as described above with reference to operation S801 of FIG. 8, further broadcasts authentication information which relates to the second device 120 and information which relates to the second device 120, and receives connection information which relates to the relay 110 from the BLE module 1122 of the first device 100. However, the information which is broadcast by the BLE module 1220 may not include the above-described related application information.

The processor 1240 may control the operation of the second device 120 such that first short distance communication is performed based on the BLE communication mode, and control the operation of the second device 120 as illustrated in the flowcharts of the second device 120 shown in FIGS. 6 and 8 by using the connection information which relates to the relay 110 which information is received from the BLE module 1122.

The memory 1250 may store a program and data as indicated in the flowcharts of the second device 120 shown in FIGS. 6, 7, and 8. The program and data stored in the memory 1250 may be defined as the program and data stored in the memory 1150 of FIG. 11.

When the second device 120 performs first short distance communication based on the NFC mode and the second short distance communication based on the Bluetooth communication mode, the second device 120 may operate based on the flowchart shown in FIG. 5 and the flowchart of the second device 120 shown in FIG. 9.

In this case, the second device 120 may include the information input and output unit 1210, the NFC module 1221, the Bluetooth communication unit 1232, the processor 1240, the memory 1250, the hardware 1260 of the second device 120, and the port 1270, but is not limited thereto.

Because the second device 120 performs second short distance communication based on the Bluetooth communication mode, the operation of the processor 1240 and the program and data stored in the memory 1250 may be different from that described above such that second short distance communication may be performed between the first device 100 and the second device 120 based on the Bluetooth communication unit 1232.

When the second device 120 performs first short distance communication based on the BLE communication mode and the second short distance communication based on the Bluetooth communication mode, the second device 120 may operate based on the flowchart shown in FIG. 6 and the flowchart of operations of the second device 120 shown in FIG. 10.

In this case, the second device 120 may include the information input and output unit 1210, the BLE module 1222, the Bluetooth communication unit 1232, the processor 1240, the memory 1250, the hardware 1260 of the second device 120, and the port 1270, but is not limited thereto.

In this case, because the second device 120 performs second short distance communication based on the Bluetooth communication mode, the operation of the processor 1240 and the program and data stored in the memory 1250 may be different from the above-described examples such that second short distance communication may be established between the first device 100 and the second device 120 based on the Bluetooth communication unit 1232.

When the second device 120 performs first short distance communication based on one of the NFC mode and the BLE communication mode and the second short distance communication based on the wireless LAN mode, the second device 120 may include the information input and output unit 1210, the NFC module 1221, the BLE module 1222, the wireless LAN communication unit 1231, the processor 1240, the memory 1250, the hardware 1260 of the second device 120, and the port 1270, but is not limited thereto.

In this case, if the first device 100 is configured as shown in FIG. 11 and transmits information which is broadcast by the BLE module 1222 to the second device 120, the processor 1240 may operate to disregard a signal which is received based on an operation of the NFC module 1221 or may disable the operation of the NFC module 1221.

However, if the first device 100 is not configured as shown in FIG. 11 and includes the NFC module 1221 only, although the BLE module 1222 operates in an active mode, the second device 120 may perform first short distance communication for establishing the connection based on the second short distance communication via the NFC module 1221. The program stored in the memory 1250 may be configured to selectively operate the NFC module 1221 and the BLE module 1222 as described above.

Meanwhile, when the second device 120 performs first short distance communication based on one of the NFC mode and the BLE communication mode and the second short distance communication based on the Bluetooth communication mode, the second device 120 may include the information input and output unit 1210, the NFC module 1221, the BLE module 1222, the Bluetooth communication unit 1232, the processor 1240, the memory 1250, the hardware 1260 of the second device 120, and the port 1270, but is not limited thereto. In this case, each element may operate similarly as described above with respect to the above-described examples.

In this case, the program stored in the memory 1250 may be different from the programs stored in the above-described examples in performing first short distance communication. The difference is that the NFC module 1221 and the BLE module 1222 are selectively operated when first short distance communication is performed.

The BLE module 1222 and the Bluetooth communication unit 1232 may be configured as a single chip based on a dual mode in a hardware manner as described with reference to FIG. 11 and may selectively operate the single chip when first and second short distance communication are performed.

The application execution method according to exemplary embodiments may also be embodied as computer readable codes on a transitory or non-transitory computer readable recording medium. The computer readable medium may be any recording apparatus which is capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and one or more of the exemplary embodiments may be stored and implemented as computer readable code in a distributed manner.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. An application execution method which is performable by using a first device, the method comprising:
   detecting, by the first device, an occurrence of a first communication in a first short distance communication mode between at least one external device and the first device;
   receiving connection information which relates to a second short distance communication mode and application information which relates to the at least one external device from the at least one external device via the first communication;
   establishing, based on the received connection information, a second communication in the second short distance communication mode between the at least one external device and the first device; and
   controlling the at least one external device via the second communication by using an application which is executable based on the received application information.

2. The method of claim 1, wherein the detecting the occurrence of the first communication is performed by using one of near field communication (NFC) and Bluetooth low energy (BLE) communication.

3. The method of claim 1, wherein the detecting the occurrence of the first communication is performed based on whether a distance between the at least one external device and the first device is within a first communication radius.

4. The method of claim 1, wherein the detecting the occurrence of the first communication is performed based on whether a broadcast signal based on Bluetooth low energy (BLE) communication is received from the at least one external device.

5. The method of claim 4, further comprising:
   displaying information which relates to the at least one external device; and
   establishing the second communication in the second short distance communication mode when a connection between the first device and an external device from among the at least one external device is selected based on the displayed information which relates to the at least one external device.

6. The method of claim 1, wherein information regarding the second communication which relates to the second short distance communication mode comprises information which relates to the second short distance communication mode which is performed by the at least one external device and additional information to be used when establishing the second communication between the first device and the at least one external device in the second short distance communication mode.

7. The method of claim 6, wherein the additional information comprises address information which relates to the at least one external device when the second short distance communication mode is based on a direct communication mode between devices.

8. The method of claim 1, wherein the establishing the second communication in the second short distance communication mode comprises:
   determining the second short distance communication mode between the at least one external device and the first device by using the received connection information which relates to the second short distance communication mode;
   transmitting, from the first device to the at least one external device, connection information which relates to a relay to the at least one external device via first communication when the second short distance communication mode is based on a communication mode which uses the relay; and receiving, from the at least one external device, a signal which indicates that a communication between the relay and the at least one external device is established.

9. The method of claim 1, wherein the establishing the second communication in the second short distance communication mode comprises:

determining the second short distance communication mode between the at least one external device and the first device by using the received connection information which relates to the second communication;

transmitting, from the first device to the at least one external device, a connection request signal by using the received connection information which relates to the second communication when the second short distance communication mode is based on a direct communication between devices; and receiving a communication acceptance signal from the at least one external device.

10. The method of claim 1, wherein the second short distance communication mode comprises at least one from among a wireless local area network (LAN) communication mode, a wireless fidelity (WiFi) direct communication mode, a Bluetooth communication mode, an ultra wideband (UWB) communication mode, and a Zigbee communication mode.

11. The method of claim 1, wherein the establishing the second communication in the second short distance communication mode comprises: registering the at least one external device in the first device when a registration request is received from the at least one external device.

12. The method of claim 1, wherein the application information which relates to the at least one external device comprises at least one of identification information which relates to the application and an execution command.

13. The method of claim 1, wherein the controlling the at least one external device comprises:

searching for the application from the first device by using the received application information;

if the application is determined not to be installed in the first device as a result of the searching, downloading and executing the application from an outside; and if the application is determined to be installed in the first device as a result of the searching, executing the application by the first device.

14. The method of claim 1, wherein the connection information which relates to the second short distance communication mode further comprises authentication information which relates to the at least one external device, wherein the establishing the second communication in the second short distance communication mode is performed after performing authentication processing by using the received authentication information.

15. A first device comprising:

a first short distance communication unit which is configured to communicate between at least one external device and the first device by using a first communication in a first short distance communication mode;

a second short distance communication unit which is configured to communicate between the at least one external device and the first device by using a second communication in a second short distance communication mode, when the first device in communication with the at least one external device based on a connection information which relates to the second short distance communication mode which is received from the at least one external device via the first short distance communication unit; and a processor which is configured to receive the connection information which relates to the second short distance communication mode and application information which relates to the at least one external device via the first short distance communication unit, in order to establish the second communication between the at least one external device and the first device, and to control the at least one external device via the second short distance communication unit by executing an application based on the received application information.

16. The device of claim 15, wherein the first short distance communication unit comprises a first communication module which is configured to communicate between the at least one external device and the first device based on a near-field communication (NFC) mode, and a second communication module which is configured to communicate between the at least one external device and the first device based on a Bluetooth low energy (BLE) communication mode.

17. The device of claim 15, wherein the first short distance communication unit comprises a communication module which is configured to communicate between the at least one external device and the first device when a distance between the at least one external device and the first device is within a first short distance communication radius.

18. The device of claim 15, wherein the first short distance communication unit comprises a communication module which is configured to communicate between the at least one external device and the first device based on a Bluetooth low energy (BLE) communication mode.

19. The device of claim 18, wherein the processor displays information which relates to the at least one external device which is received based on the BLE communication mode, and establishes the second communication based on the second short distance communication mode when a connection request signal with respect to the at least one external device is received based on the displayed information which relates to the at least one external device, and the first device further comprises: an information input and output unit which is configured to display the information which relates to the at least one external device and to input the received connection request signal with respect to the at least one external device.

20. The device of claim 19, wherein the information input and output unit is configured based on a touch screen.

21. The device of claim 15, wherein the connection information which relates to the second short distance communication mode comprises information which relates to the second short distance communication mode which is performed by the at least one external device and additional information to be used to establish the connection based on the second short distance communication mode.

22. The device of claim 21, wherein the additional information comprises address information which relates to the at least one external device when the second short distance communication mode is based on a direct communication mode between devices.

23. The device of claim 15, wherein the processor is configured to determine the second short distance communication mode between the first device and the at least one external device based on the received connection information which relates to the second short distance communication mode, transmit connection information which relates to a relay to the at least one external device via the first short distance communication unit when the second short distance communication mode is based on a communication mode which uses the relay, and receive, from the at least one external device, a signal which indicates that the at least one external device is in communication with the relay.

24. The device of claim 15, wherein the processor is configured to determine the second short distance communication mode between the first device and the at least one external device based on the received connection information which relates to the second short distance communication mode, transmit, via the second short distance communication unit, a connection request signal to the at least one external device by using the received connection information which relates to the second short distance communication mode when the second short distance communication mode is based on a direct communication mode between devices, and receive, via the second short distance communication unit, a connection acceptance signal from the at least one external device.

25. The device of claim 15, further comprising: a memory which is configured to store registration information which relates to the at least one external device,
    wherein the processor is configured to store the registration information which relates to the at least one external device in the memory when a registration request is received from the at least one external device via the first short distance communication unit.

26. The device of claim 15, wherein the application information which relates to the at least one external device comprises at least one of identification information which relates to the application and an execution command.

27. The device of claim 15, further comprising: a memory which is configured to store at least one application,
    wherein the processor is configured to search for a first application in the memory by using the received application information, and if the first application is not stored in the memory, download the first application from an outside, and store and execute the first application in the memory, and if the first application is stored in the memory, execute the first application.

28. The device of claim 15, wherein the connection information which relates to the second short distance communication mode further comprises authentication information which relates to the at least one external device,
    wherein the processor is configured to establish the second communication between the first device and the at least one external device based on the second short distance communication mode after performing authentication processing by using the received authentication information.

29. The device of claim 15, wherein the second short distance communication mode comprises at least one from among a wireless local area network (LAN) communication mode, a wireless fidelity (WiFi) direct communication mode, Bluetooth communication mode, an ultra wideband (UWB) communication mode, and a Zigbee communication mode.

30. A non-transitory computer readable recording medium having recorded thereon at least one program which includes commands for executing an application execution method for a first device,
    wherein the application execution method comprises:
    detecting, by the first device, an occurrence of first communication in a short distance con ode between at least one external device and the first device;
    receiving connection information which relates to a second short distance communication mode and application information which relates to the at least one external device from the at least one external device via first communication;
    establishing, based on the received connection information, a second communication in the second short distance communication mode between the at least one external device and the first device; and
    controlling the at least one external device via the second communication by using an application which is executed based on the received application information.

\* \* \* \* \*